(12) United States Patent
Konstanczak

(10) Patent No.: US 8,966,851 B2
(45) Date of Patent: Mar. 3, 2015

(54) BUILDING PANEL

(75) Inventor: Marek Konstanczak, Barlinek (PL)

(73) Assignee: Barlinek S.A., Kielce (PL)

( * ) Notice: Subject to any disclaimer, the term of this patent is extended or adjusted under 35 U.S.C. 154(b) by 0 days.

(21) Appl. No.: 13/463,083

(22) Filed: May 3, 2012

(65) Prior Publication Data

US 2012/0279158 A1  Nov. 8, 2012

(30) Foreign Application Priority Data

May 3, 2011  (EP) .................................... 11003597

(51) Int. Cl.
| | |
|---|---|
| *E04F 15/04* | (2006.01) |
| *E04F 15/02* | (2006.01) |
| *E04F 13/08* | (2006.01) |
| *F16B 5/00* | (2006.01) |

(52) U.S. Cl.
CPC ........... *E04F 15/02038* (2013.01); *E04F 15/04* (2013.01); *E04F 13/0894* (2013.01); *E04F 2201/0146* (2013.01); *E04F 2201/0153* (2013.01); *E04F 2201/0176* (2013.01); *E04F 2201/0535* (2013.01); *F16B 5/0056* (2013.01)
USPC ........................................ 52/582.1; 52/589.1

(58) Field of Classification Search
CPC ............................ E04F 15/04; E04F 15/02005
USPC ............... 52/582.1, 489.1, 589.1, 591.1, 578, 52/588.1
See application file for complete search history.

(56) References Cited

U.S. PATENT DOCUMENTS

| | | | | |
|---|---|---|---|---|
| 6,854,235 | B2 * | 2/2005 | Martensson | 52/601 |
| 7,726,088 | B2 * | 6/2010 | Muehlebach | 52/582.1 |
| 7,841,145 | B2 * | 11/2010 | Pervan et al. | 52/395 |
| 8,132,384 | B2 * | 3/2012 | Hannig | 52/582.1 |
| 8,220,217 | B2 * | 7/2012 | Muehlebach | 52/582.1 |
| 8,365,499 | B2 * | 2/2013 | Nilsson et al. | 52/747.1 |
| 2004/0068954 | A1 * | 4/2004 | Martensson | 52/592.1 |
| 2007/0006543 | A1 * | 1/2007 | Engstrom | 52/582.1 |
| 2012/0279158 | A1 * | 11/2012 | Konstanczak | 52/582.1 |

FOREIGN PATENT DOCUMENTS

| | | |
|---|---|---|
| DE | 10237397 A1 | 2/2004 |
| DE | 202009004530 U1 | 7/2009 |
| WO | 0047841 A1 | 8/2000 |
| WO | 2008004960 A2 | 1/2008 |

OTHER PUBLICATIONS

European Search Report received in EP Appln. No. 11 00 3597, dated Sep. 20, 2011.

* cited by examiner

*Primary Examiner* — Andrew J Triggs
(74) *Attorney, Agent, or Firm* — The Law Office of Michael E. Kondoudis

(57) ABSTRACT

A building panel comprising a device for connecting the building panel to at least one further similar building panel on a sub-surface. The building panel is intended to be lowered against an already installed building panel. Each panel has first and second profiled side surfaces, at each of which an abutting surface is disposed, which is perpendicular to a usable surface or base surface of the building panel.

20 Claims, 28 Drawing Sheets

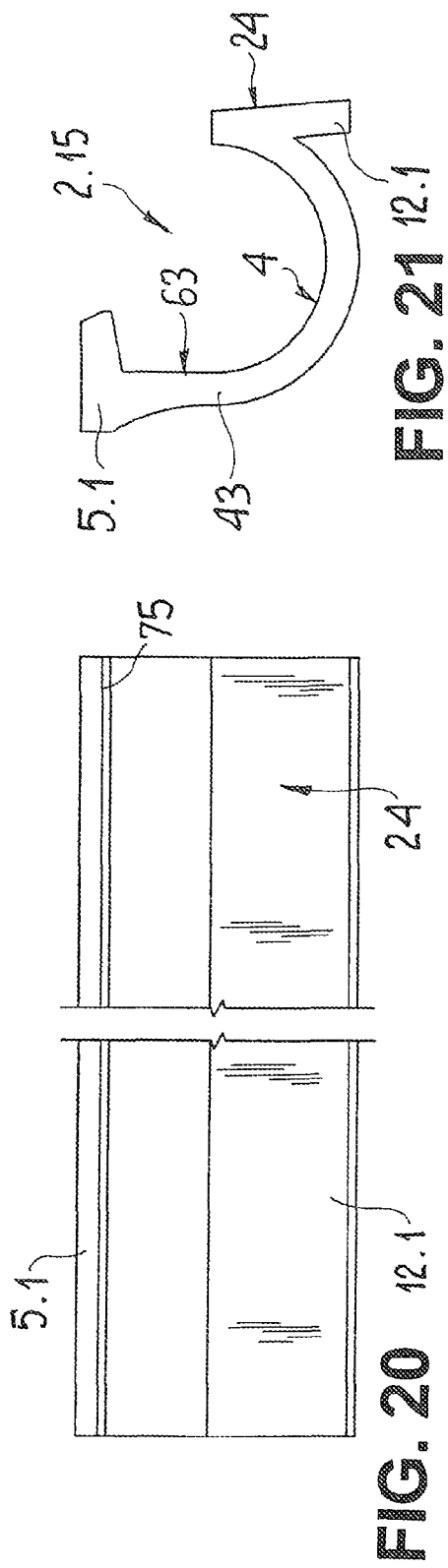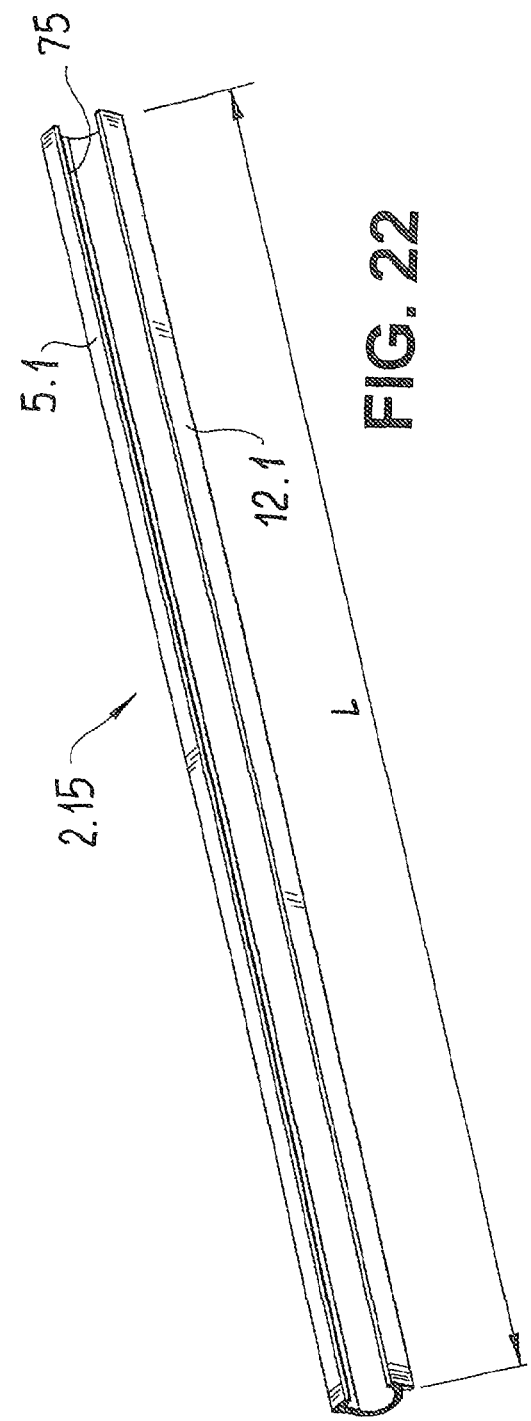

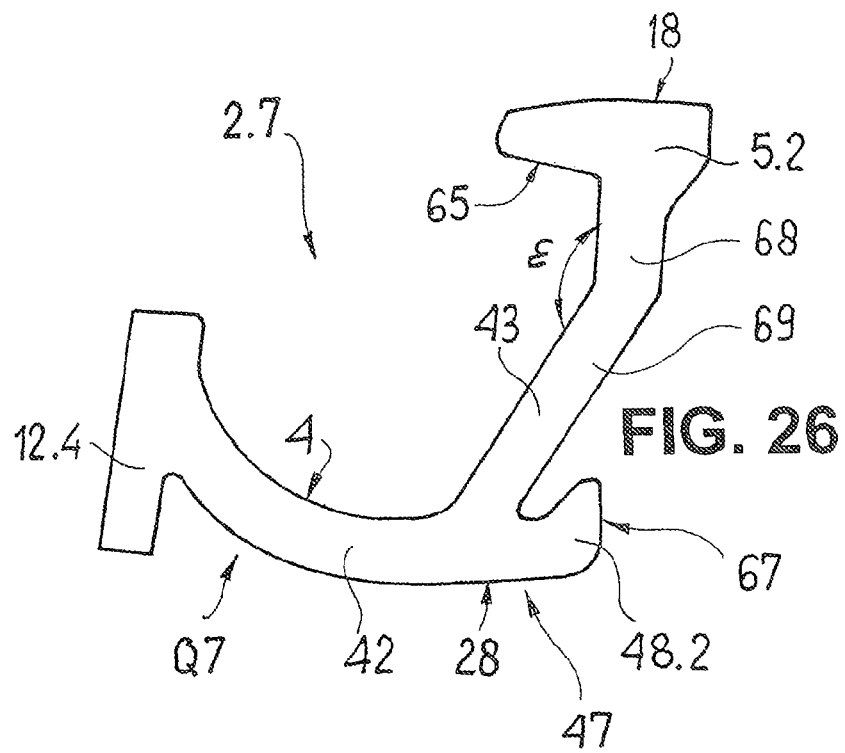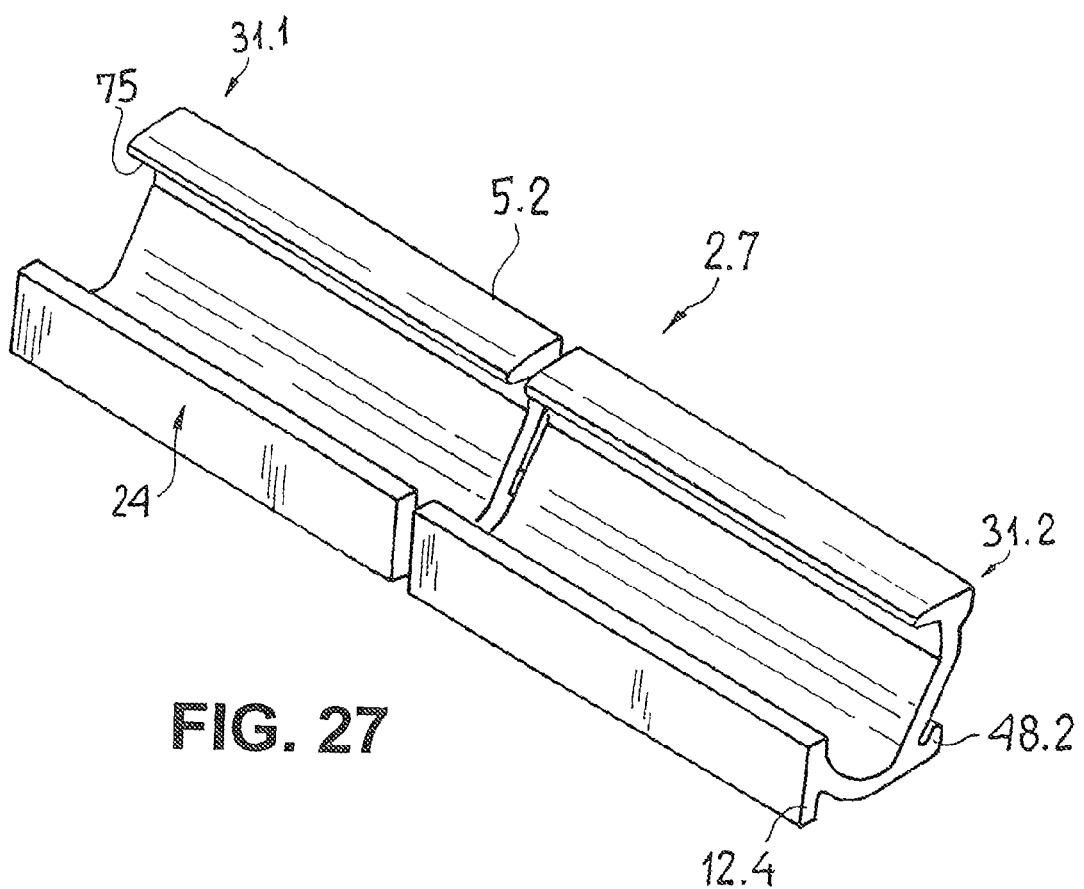

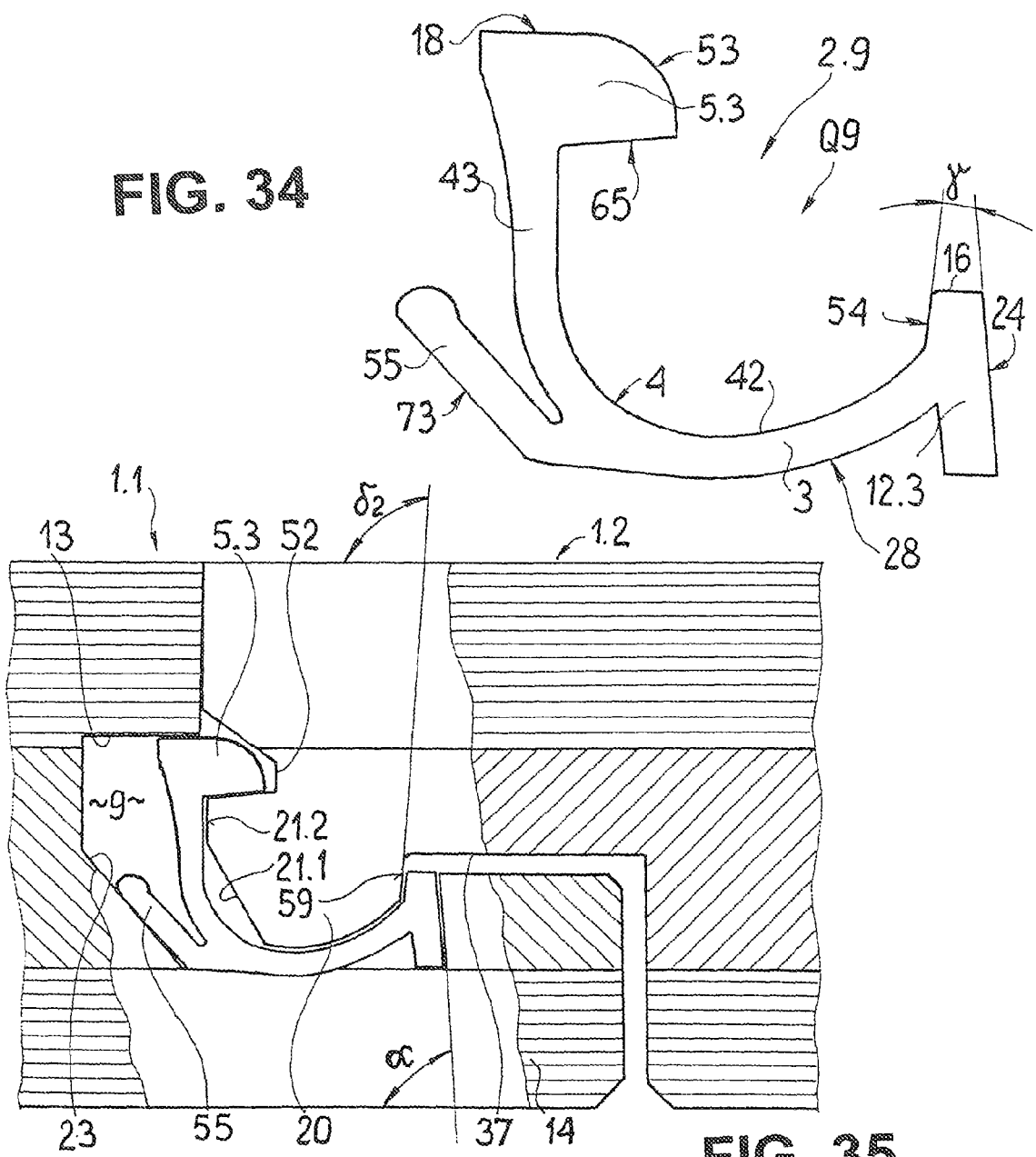
FIG. 34
FIG. 35
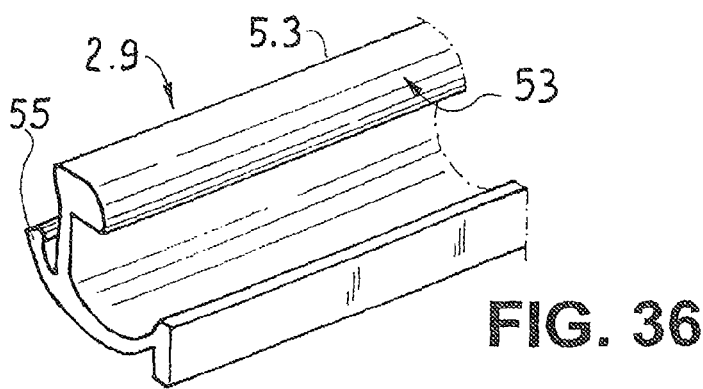
FIG. 36

BUILDING PANEL

The invention relates to a building panel comprising a device for connecting the building panel to at least one further similar building panel on a sub-surface, wherein the building panel is intended to be lowered against an already installed building panel, wherein:
  each building panel has first and second profiled side surfaces, at each of which an abutting surface is disposed, which is perpendicular to a usable surface or base surface of the building panel;
  the abutting surface of the first side surface transitions into a first groove, which extends along the side surface of the building panel;
  a locking arm protrudes over the abutting surface of the first side surface of the building panel;
  the locking arm ends in an approximately trapezoidal lip, which is directed towards the usable surface and has, in turn, an inner surface ending in a bottom of the locking arm;
  the first groove has a bottom, which is set back from the abutting surface of the first side surface;
  an elongated, at least partly flexible, separate connector, which in the installed state of the building panel cooperates with the second side surface of an opposing building panel, is inserted at least partly in the first groove of the building panel;
  the connector, in the undeformed state, has an approximately gutter-shaped cross-section and an at least partly arched wall, comprising a base part and a leg;
  an at least sectionally partly cylindrical or partly elliptical inner surface of the wall transitions at one edge of this inner surface, as seen in the cross-section of the connector, into a head piece and, at a different edge, into a foot;
  the foot has a side surface, which is directed outward and faces the inner surface of the lip in the installed state, and a base adjoining the side surface;
  in the installed state of the connector, the head piece of the connector points in the direction of the usable surface;
  in the installed state of the connector, the leg, which adjoins the base part and ends in the head piece, is disposed movably so that, when the building panels are joined, the leg can be swiveled together with the head piece in the direction of the bottom of the groove;
  the second side surface has a locking roller, which, while two building panels are being joined, engages the inner space of the opposing building panel spanned by the inner surface of the connector;
  the locking roller transitions into a recess of the building panel which is open in the direction of the base surface;
  the bottom of the locking arm and the first groove, as well as the inclined inner surface of the lip, form a seat for accommodating the connector; and
  wherein the head piece, in the state in which the connector is fitted into the first groove, presses at least in some sections against a first flank of said groove.

A building panel comprising such a device is known from WO 2008/004960. An approximately boomerang-shaped connector, having a seesaw-like action, is inserted according to FIGS. 6a to 6d into a semicircular recess of an already installed building panel. The connector is moved by a counter panel by means of a lever action until a thicker edge of the connector, as seen in the cross-section of the panel connection, snaps into a groove of the counter panel compatible with the edge. The separate connector serves to ensure that the building panels are locked substantially perpendicularly to the walk-on surface. The locking arm, with the lip thereof, serves for horizontal locking in the conventional manner. While the known connector has an additional, separate lip, which is directed toward the counter-panel, this lip only reinforces the existing horizontal lock. It is a disadvantage of the known device that the connector, before the two building panels are joined, can fall out of the fastening in the groove relatively easily, especially when the material of the connector is elastic. The stability of the connection appears to be inadequate.

The DE 20 2009 004 530 U1 describes floor panels with coupling parts, which form a horizontally active and vertically active locking system, comprising a separate connector made of a co-extruded plastic strip having regions with different properties, and especially of varying flexibility. One region of the connector forms a hinge, which divides the connector into a base having a foot and a head piece, which is directed to the base of the panel. It is a disadvantage that the connector, and especially the foot, can fall out of the seat thereof relatively easily when the connector is being mounted.

DE 102 37 397 A1 shows different embodiments of an elastic, one-part or two-part connector comprising hollow chambers, which resembles a profiled window seal section. In addition, an anchor-like, two-part connector can be inferred from FIG. 5. For this connector, a central web, which is referred to as a strut and protrudes over a side surface of the one panel, engages with an inner space of a C profile with a head piece, the C-profile being pressed into a groove of a second panel. The profiled side surfaces of the two panels, which are connected to one another, extend essentially at an angle to the walk-on surface of the panel, the coupled parts of the connector being directed perpendicularly to the side surfaces. The two parts of the connector are constructed in mirror image fashion symmetrically to the longitudinal axis. It is a disadvantage of a panel connection so constructed, comprising a two-part connector of FIG. 5, that a subsequent separation of the floor panels, which are connected to one another, cannot be realized. Connecting the floor panels to one another, or installing them on a sub-surface, also appears to be a problem, because installation in the horizontal direction with the aid of a known hammering block is impossible and an installation with a swiveling motion is particularly difficult.

WO 00/47841 A1 relates, among other things, to an elastic profile, which is inserted in a groove of the floor panel and has angular edge regions directed towards the interior of the profile. This embodiment of the profile likewise involves a risk of this fall out of the seat thereof relatively easily.

Moreover, several embodiments of other connectors with a seesaw-like action are known.

It is the object of the invention to develop an alternative device of the type in question for connecting polygonal, board-shaped building panels to one another with the aid of the separate connectors, which do not have a seesaw-like action and which are held securely and stably on the building panel.

This object is achieved by a device of the type mentioned above, in which
  the side surface and the base, facing the bottom, of the foot of the connector are in contact with the inner surface of the lip and the bottom of the locking arm before and after the two building panels are joined,
  wherein the lip of the locking arm tapers in the direction of the bottom layer in such a manner that the inner surface of the lip is inclined at an acute angle with respect to the bottom of the locking arm or to the base surface of the building panel, and wherein the locking roller has at least one flat pressing surface, which, during the connection of two building panels, strikes against the head piece, whereby the head piece is swiveled in the direction of the bottom of the groove.

The similarity between the connectors according to the invention and conventional gutters, such as semicircular or partially elliptical gutters, lies in the fact that the head piece of the connector corresponds approximately to the drip edge of the gutter and the foot corresponds to the bead of the gutter facing away from the drip edge.

Moreover, the building panel which is pivoted downwards against the already installed panel is referred to as the counter panel. Terms such as "top", "upper", "bottom", "lower", "underneath", "above", and the like refer to building panels installed on a sub-surface, as is also shown in the drawing. Furthermore, the separate connector is referred to as a profile.

The device according to the invention is, in general terms, one which comprises a so-called hook connection, for which the parts forming the hook connection, which is to say the lip at the locking arm and the locking roller of the counter panel directed toward the bottom, are normally to interlock tightly with one another, and the abutting surfaces of the two building panels are to be brought into areal contact with one another, in order to ensure locking of the building panels in the horizontal direction. With the known solution according to WO 2008/004960, this prerequisite can also be fulfilled if the connector is removed from the groove. The separate connector according to WO 2008/004960 is located outside the surfaces that form the actual hooked connection.

It is readily apparent that the hooked connection of the solution according to the invention comes about only after the two building panels are joined, in that the web-shaped foot is located between the inner surface of the lip and the locking roller engaging the connector during the joining of the building panels. If the connector were to be removed, it would not be possible to speak of a hooked connection because of the gap that is formed. In this situation, the two building panels, before they are shifted towards one another, would not be secured in the horizontal and vertical directions. It is of great advantage that the profile according to the present invention can ensure locking simultaneously in both directions.

Preferably, the separate connector according to the invention is produced from a plastic material. Thermoplastic materials, such as polyethylene (PE), polypropylene (PP), polystyrene (PS), polyamides (PA), polycarbonates (PC), polyethylene terephthalate (PET), and the like, as well as the so-called engineering plastics, such as styrene copolymers (ABS), polyamides (PA), polycarbonates (PC), polyethylene terephthalate (PET), poly(methyl methacrylate) (PMMA), polyoxymethylene (POM), fluoroplastics (Teflon), polyurethanes (PUR) may be used as plastic materials for the connector.

The foot of the profile may be web-shaped or solid, it being of decisive importance that this foot has an inclined side surface, the angle of inclination of which to the base corresponds to said acute angle at the lip. The foot and the lower part of the installed profile can thus be seated against the locking arm substantially positively, and more specifically, before and after the counter panel is lowered.

In a transition region of the base part to the movable leg, the connector may have at least one outwardly protruding projection, extending in the longitudinal direction of the connector. In the inserted state of the connector, the projection may be in contact with the flank of the second groove.

The profile may also be produced from so-called integral plastics. Such a profile may, for example, have a hard foot and a relatively soft leg adjoining the head piece. Moreover, the head piece and the foot may be stiffer than the legal material of the profile. The profile may have smooth and/or roughened surfaces.

Furthermore, the profile may be produced from metals, derived timber products or composite materials.

The profile may be deformable elastically at least in the leg region thereof. The elasticity of the profile may be supported by appropriate constrictions or by soft transitions of the leg to the foot.

The head piece may have a strip-shaped, flat bearing surface, which faces the first groove flank in the inserted state and which, in turn, is continued in a downward pointing, beveled or rounded sliding surface, as seen in the cross-section of the profile.

Preferably, the first, upper flank of the groove for accommodating the profile extends parallel and the second, lower flank of the groove extends at an angle to the usable or base surface of the building panel, the lower flank of the groove transitioning into the bottom of the locking arm. The two groove flanks adjoin a bottom of said groove, which is disposed perpendicularly to the usable surface. A groove, so configured, has sufficient space for swiveling the head piece. In the state in which it is not stressed by the counter panel as the latter is being lowered, the flat bearing surface of the head piece remains in two-dimensional contact with the upper groove flank or presses against it.

The bottom of the locking arm extends preferably parallel to the base surface and then forms a supporting surface for the foot and for the lower part of the wall of the connector. In particular, a flat or stepped bottom is suitable for accommodating a solid foot, the flat base of which is wider than that of the web-shaped foot.

At least one depression, which extends parallel to the groove and preferably is located approximately in the center of the bottom and, in any case, outside the lower inclined groove flank, may be incorporated in the bottom of the locking arm. The lower part of the inserted profile, which is to say the base part thereof, may be supported in the depression. The principle of at least three contact surfaces of this profile with the lower building panel, which is to say with the inclined inner surface of the lip, with the bottom of the locking arm and with the upper flank of the first groove, applies for the installed profile according to the invention. The profile, so fixed, is seated securely at the side surface of the lower building panel and has hardly any possibility of becoming loose independently.

In a particularly advantageous embodiment of the invention, four contact surfaces of the profile with the lower building panel are provided. The fourth contact surface is brought about by a resilient web protruding downward from the profile, or at least one downwardly protruding, elastic tongue, which, in the inserted state, presses against the lower, beveled flank of the first groove. An even more stable position of the profile, accommodated in the seat, is thus achieved.

During the downward swiveling of the building panel in the direction of the bottom of the already installed building panel, the head piece can carry out a rotational movement around the depression or around a gradation of the bottom of the locking arm. The leg of the profile is thus swiveled. At the same time, the foot of the connector can remain immobile at the inner surface of the lip and at the base part of the profile.

The profiles may be pressed manually, or mechanically, or with the aid of automatic machines, at the plant into the existing groove of the building panel. The building panels, provided with the profiles, can be stored and sold in this form.

If this profile is produced from plastic, it can be made available relatively inexpensively as a mass-produced article.

The profiles according to the invention are basically intended for the small edges of the building panel. However, they may also be integrated into the longer side surfaces of the building panel, if these are adapted appropriately to the separate connector.

It is advantageous if a pressing surface, disposed at an angle with respect to the usable surface, is introduced on the locking roller located at the counter panel, and by means of this pressing surface a pressure is exerted on the planar contact surface, primarily on the rounded or beveled sliding surface of the head piece. The beveled pressing surface of the downwardly directed locking roller is located at an angle of ≧45°, and preferably of 60°, relative to the usable surface. An angle of this size ensures optimum sliding of the locking roller on the head piece, while preventing the head piece from falling out of the seat.

The rounded surface of the locking roller can transition into a bevel, which is set back from the upper abutting surface of the building panel in such a manner that a sharper, approximately V-shaped, transition for accommodating the head piece is formed.

However, the head piece can also engage with a groove of the building panel carrying the locking roller. Preferably, the groove is trapezoidal.

Advantageously, the rounded surface of the locking roller transitions, via a flat surface, which is disposed at an angle to or perpendicularly to the usable surface, into the downwardly open recess of the building panel carrying the locking roller. To this end, a strip-shaped inner surface of the upper part of the foot may be provided, which is compatible with said flat surface.

The building panels as such can be produced from plastic materials, metals, derived timber products, including paper, or other renewable raw materials, such as cork. The building panels may be of solid construction or produced in layers, such as the known HDF or MDF panels, and may have a wood or tile décor, which is covered with at least one layer of a transparent or translucent synthetic resin. The building panels may be provided with antibacterial and/or fire-retardant materials.

The building panels may be used as floor panels, as wall lining panels or as parts of furniture.

Exemplary embodiments of the invention are described in greater detail based on the drawings, wherein:

FIGS. 20 and 21 show the connector of FIGS. 17 and 18 without chamfered ends for the head piece, in a top view of a side surface of the foot of the connector, and in a side view of the connector, showing the profile;

FIG. 22 shows a perspective view of the connector of FIGS. 20 and 21;

FIG. 26 shows a connector having a different projection, in the cross-section of the profile;

FIG. 27 shows a perspective view of the connector of FIG. 26;

FIG. 34 shows a connector having a different, web-shaped projection, in the cross-section of the profile;

FIG. 35 shows a sectional view of two building panels, which are connected to one another, comprising an inserted connector of FIG. 34;

FIG. 36 shows a perspective view of a section of the connector of FIG. 34;

Figure 1:
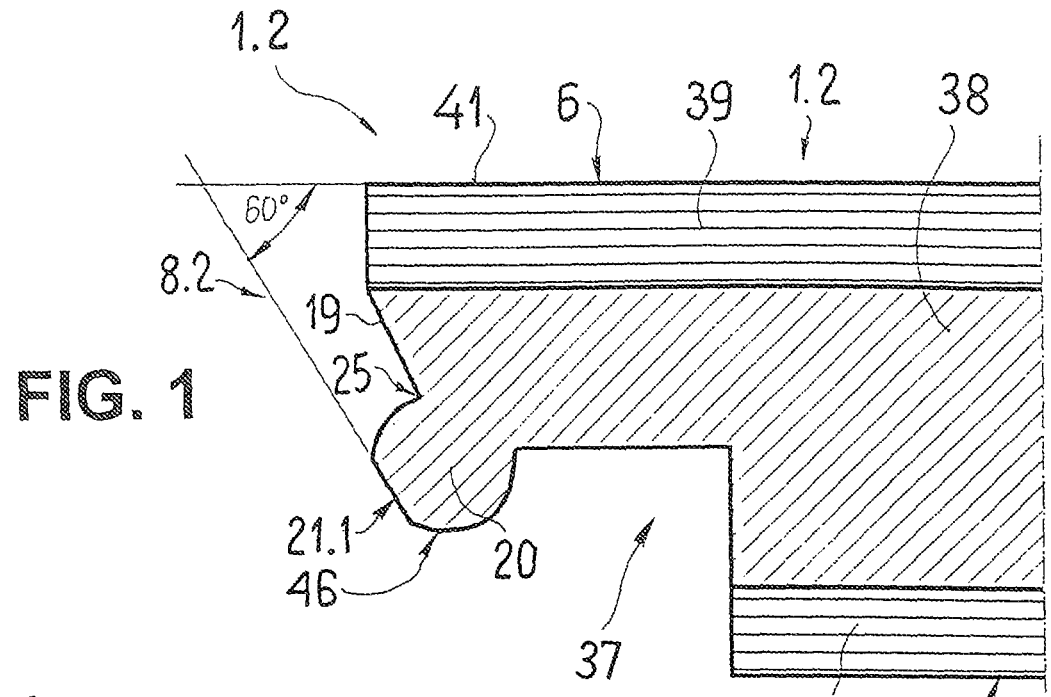
FIGS. 1 and 2 show two building panels, in each case, in the regions of the side surfaces thereof, without connectors, and in each case, in a sectional view.
Figure 2:
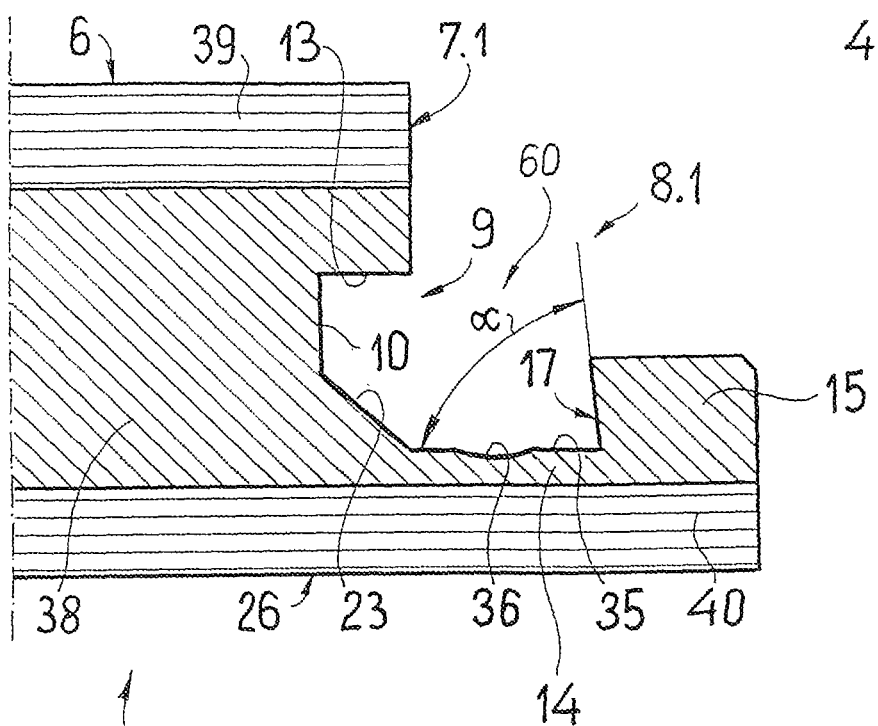
Figure 16:
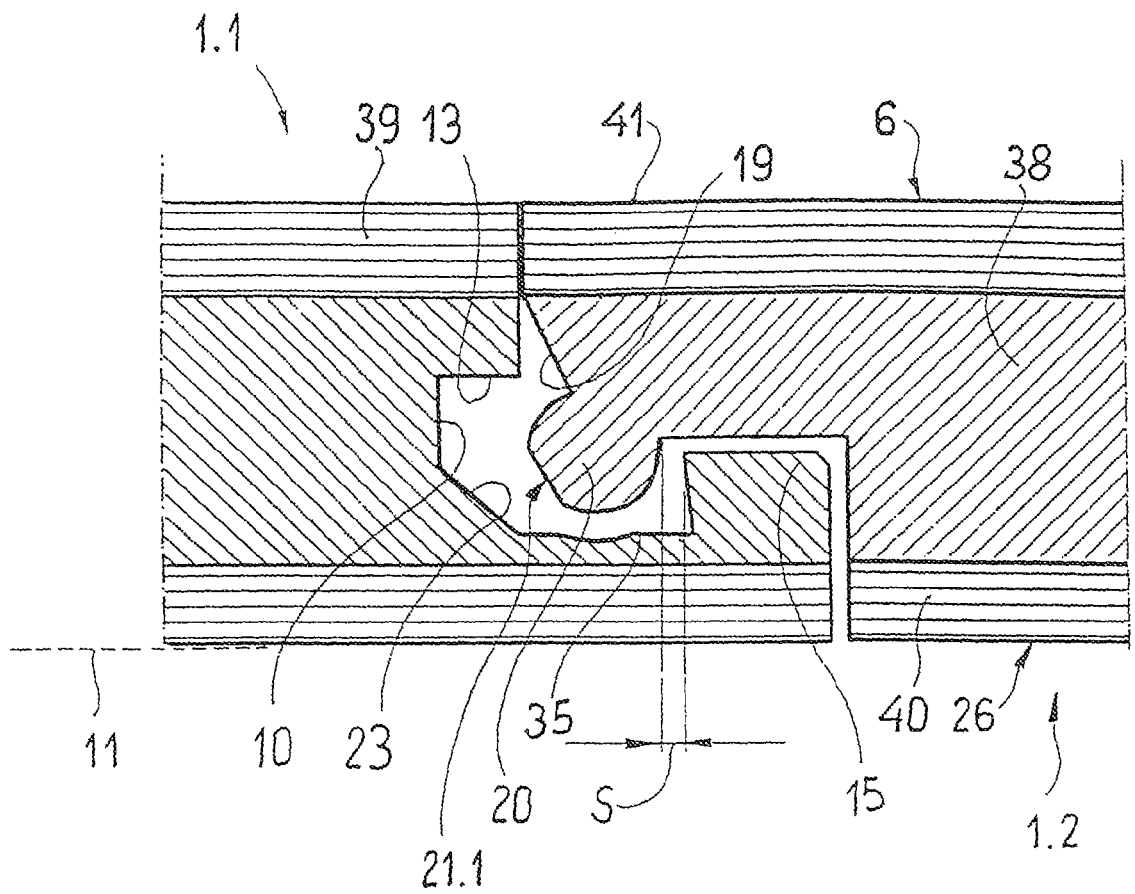
FIG. 16 shows a sectional view of installed building panels of FIGS. 1 and 2, however, without the connector.

FIGS. 1, 2 and 16 show two building panels 1.1, 1.2 before and after building panel 1.2 (counter panel) is swiveled downward in the direction of the sub-surface 11, on which building panel 1.1 has already been installed. The absence of a separate connector, which will be described in detail hereafter, is characteristic of the figures.

Each of the two building panels 1.1, 1.2 comprises a usable layer 39, a bottom layer 40 and, between these, a core layer 38 made of derived timber product. The usable layer 39 is provided with a decor layer 41, the surface of which forms a walk-on surface or a usable surface. The bottom layer 40, in turn, has a base surface 26 facing the sub-surface 11.

The building panel 1.1 is distinguished by a profiled side surface 8.1, which is bounded by the usable surface 6 and the base surface 26, has an abutting surface 7.1, a first groove 9, which is set back with respect to the abutting surface, and a locking arm 14, which protrudes beyond the abutting surface 7.1 and has an upwardly protruding lip 15.

The first groove 9 is polygonal in cross-section and has a bottom 10, which is set back with respect to the abutting surface 7.1, disposed parallel to the abutting surface 7.1 and ends in an upper groove flank 13, which is plane-parallel to the usable surface 6, and in a lower groove flank 23, which extends at an angle. The latter, in turn, transitions into a bottom 35 of the locking arm 14, the bottom being parallel to the base surface 26, and a depression 36 extending along the side surface 8.1 being milled out in the middle of the bottom 35.

The lip 15 of the locking arm 14 is trapezoidal and tapers in the direction of the bottom layer 40 in such a manner that an inner surface 17, which is inclined at an acute angle α to the bottom 35, is formed at the lip. In the present case, the angle α is between 80° and 85° and may vary.

As shown in FIG. 1, a seat 60 for accommodating the connector is formed by the bottom 35 of the locking arm 14, by the inner surface 17 of the lip 15 and by the first groove 9 or the upper flank 13 of this groove.

The building panel 1.2 is distinguished by a profiled side surface 8.2, which is bounded by the walk-on and base surfaces 6, 26 and has an abutting surface 7.2, a bevel 19, which is set back with respect to the abutting surface 7.2, and a downwardly directed locking roller 20. Together with the locking roller 20, the bevel 19 forms a deep, sharp, V-shaped transition 25.

A pressing surface 21.1, which forms an acute angle with the usable surface 6 and is disposed approximately parallel to the bevel 19, is milled at the locking roller 20. The acute angle preferably is 60°. The locking roller 20 adjoins a recess 37, which is open in the downward direction, for accommodating the lip 15 of the building panel 1.1.

In FIG. 16, a relatively wide gap S can be seen between the locking roller 20 and the lip 15, when the two abutting surfaces 7.1, 7.2 are in contact with one another. At the same time, the building panels 1.1, 1.2 are not locked together either in the horizontal or in the vertical direction.

Figure 7:
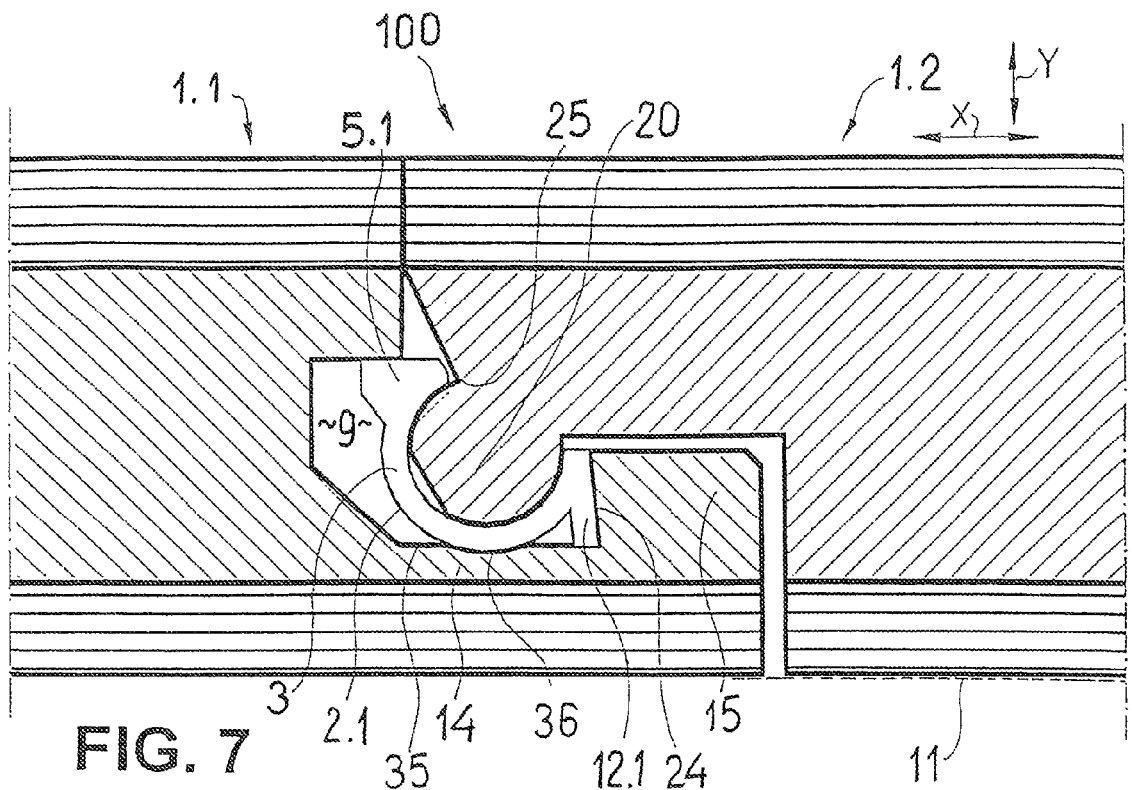

A similar position of the building panels 1.1, 1.2 installed on the sub-surface 11 can be inferred from FIG. 7. However, a separate connector 2.1 (profile) is inserted here in such a way that the gap S (compare FIG. 16) is filled completely by a web-shaped foot 12.1 of the profile. The building panels 1.1, 1.2, together with the inserted profile 2.1, form a device 100, in which the profile brings about locking in both directions (compare FIG. 7, arrows X, Y).

The approximately gutter-shaped profile 2.1 (compare FIGS. 8 and 9) has a cross-section Q1, on which a partly cylindrical inner surface 4, a likewise partly cylindrical outer surface 28, a head piece 5.1 and the foot 12.1 can be recognized. The inner and outer surfaces 4, 28 form the boundary of a flute-shaped wall 3, which extends from the head piece 5.1 to the foot 12.1.

Figure 9:
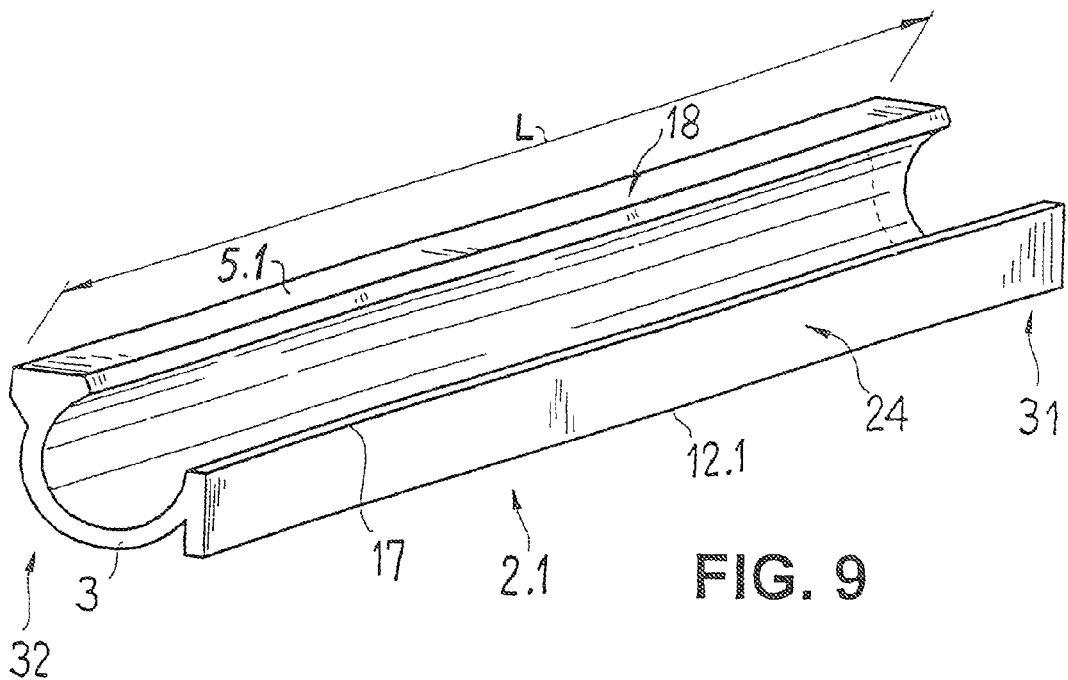
FIG. 9 shows a perspective view of the connector of FIG. 8.
Figure 56:
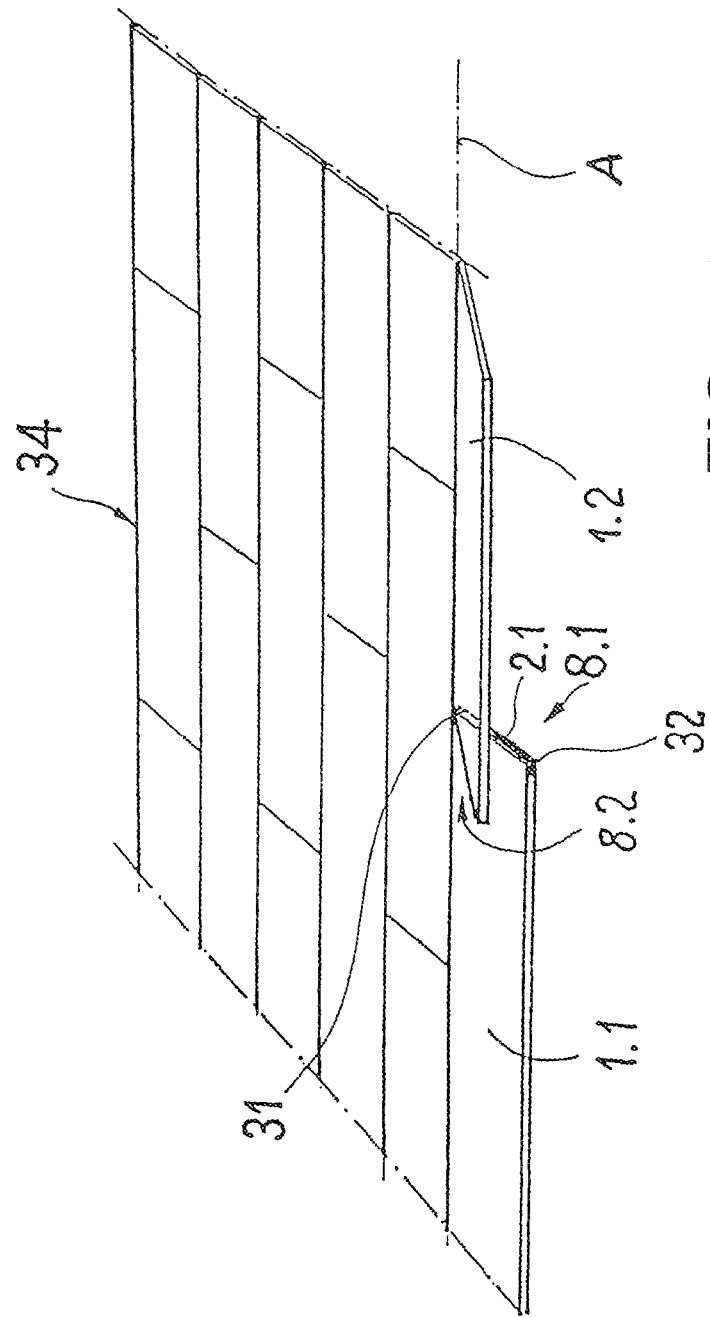
FIG. 56 shows a perspective view from above of a floor.

The profile 2.1, shown in FIG. 9, is relatively short and therefore intended for the narrow sides of the building panels. The length L of the profile corresponds essentially to the dimension of the narrow side or is slightly smaller. A floor 34, indicated schematically in FIG. 56, is composed of several of the building panels 1.1, 1.2, which are described above and which are locked together at the narrow sides thereof via the separate connectors, and at the long sides are locked by conventional tongue-and-groove connections, which are not shown.

The foot 12.1 has an inclined side surface 24, the angle of inclination of which is equal to the angle α (compare FIG. 2). Furthermore, the foot 12.1 has a base 27 and an elongated, upper edge 16, which is located opposite the base 27 and adjoins said partly cylindrical inner surface 4.

The upper bearing surface 18 of the head piece 5.1, which is bounded by a further beveled sliding surface 22 on the inside, forms an essential feature of the head piece 5.1.

Figure 3:
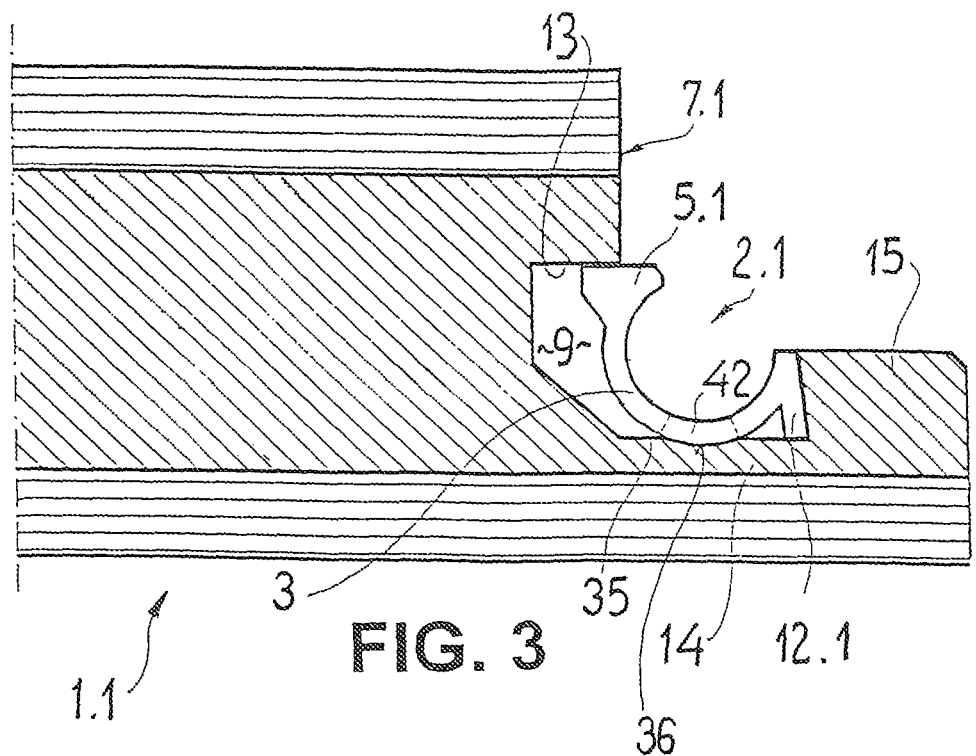
FIGS. 3 and 4 Show, in each case, a building panel comprising an inserted connector, in two positions of the head piece, and in each case, in a sectional view.
Figure 4:
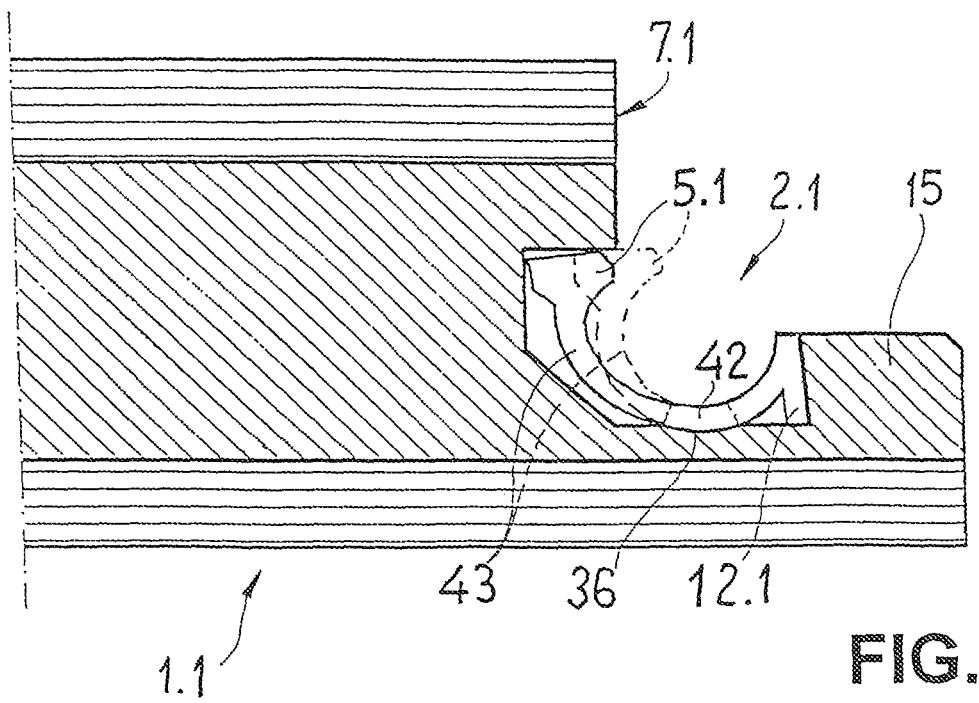

The profile 2.1, which is pressed into the building panel 1.1, is also shown in FIGS. 3 and 4. The head piece 5.1 is in contact with the upper groove flank 13 and protrudes beyond the abutting surface 7.1. The base 27 of the foot 12.1 is supported on the floor 35 and the side surface 24 thereof is supported at the inner surface 17 of the lip 15. The arched, lower base part 42 of the wall 3 is supported, in turn, at the depression 36 (compare FIG. 3). In this way, the profile 2.1 is fixed to the building panel 1.1 and prevented from falling out of the seat 60.

As shown in FIG. 4, a leg 43 of the wall 3, which extends up to the base part 42, is flexible. Since the leg 43 carries the head piece 5.1, the latter is disposed so that it can also be swiveled relative to, or rotated around, the base part 42.

Figure 5:
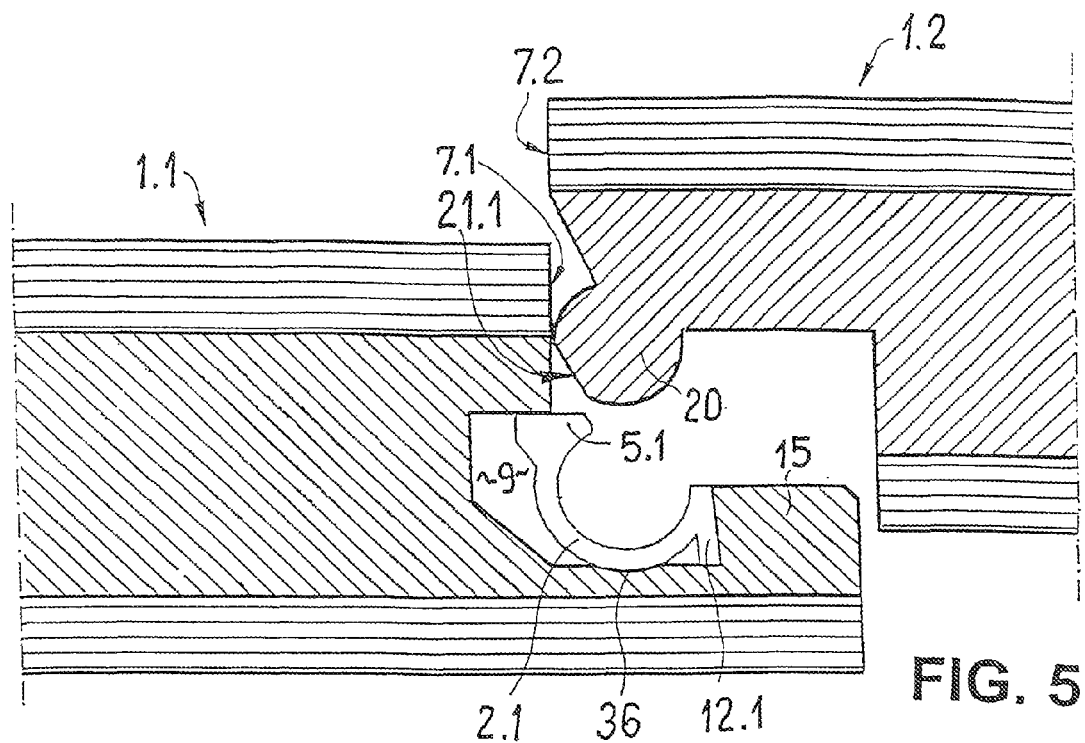
FIGS. 5 to 7 Show, in each case, two building panels comprising an inserted connector, in three positions of the building panel, which has been swiveled downward, and in each case, in a sectional view.
Figure 6:
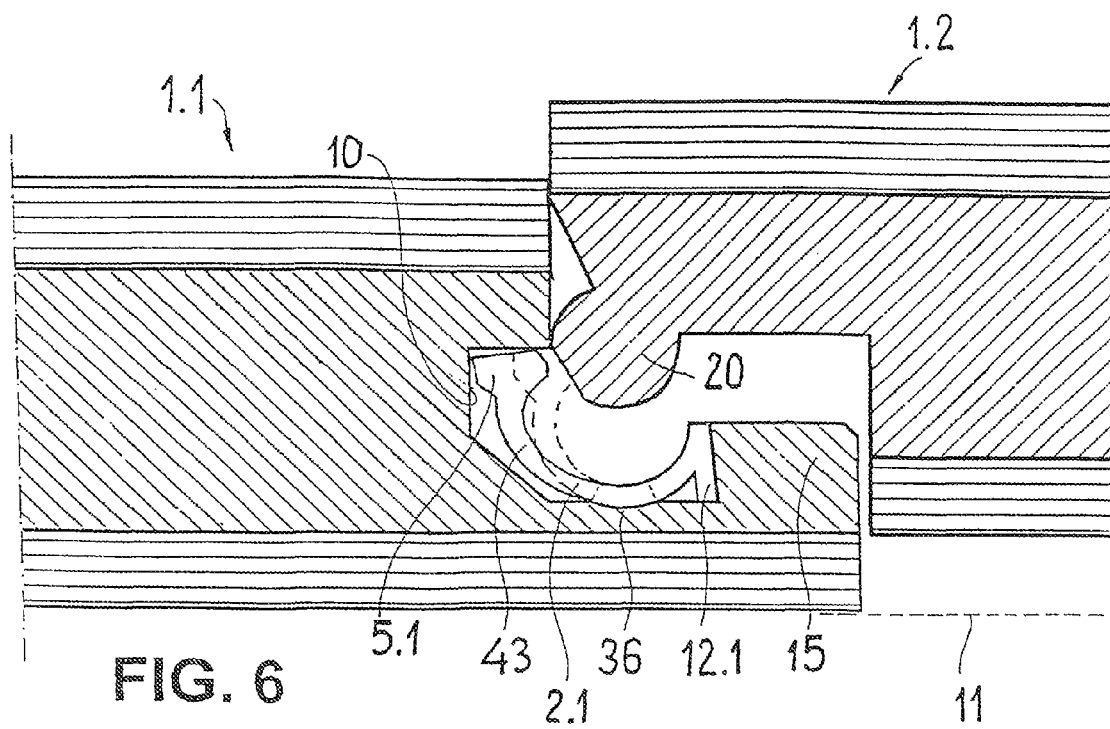

FIGS. 5, 6 and 56 show the downward pivoting of the counter panel 1.2 to the sub-surface 11. The counter panel is rotated around the pivot axis A (compare FIG. 56). In the position shown in FIG. 5, the locking roller 20 moves downward. It slides over the abutting surface 7.1 of the already installed building panel 1.1, until the beveled pressing surface 21 thereof strikes against the head piece 5.1 (compare FIGS. 5 and 6). After that, the pressing surface 21 of the locking roller 20 slides over the bearing and sliding surfaces 22, 18 of the head piece shown in FIG. 8, until the head piece is pivoted in the direction of the bottom 10 of the groove and reaches the locking position shown in FIG. 7, in which the head piece 5.1 snaps into the V-shaped transition 25 of the bevel 19 to the locking roller 20.

As the counter panel 1.2 is pivoted downward in the direction of the bottom 35 of the already installed building panel 1.1, the profile 2.1 is subjected to a torsion, by means of which the head piece 5.1 is rotated gradually in such a manner that, first, an end 31 facing the pivot axis A of the building panel and, subsequently, a second end 32 of the profile, are moved completely under the upper groove flank 13. In the present case, torsion shall be understood to mean the twisting of only a portion of the profile, which is to say the leg 43 and the head piece 5.1, whereas the foot 12.1 remains unmoved in the position thereof.

Figure 10:
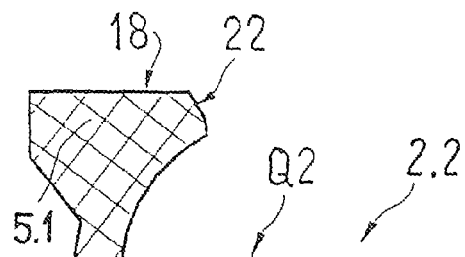
FIG. 10 shows a connector comprising a solid foot, in a cross-section of the profile.

FIG. 10 shows a connector 2.2, the structure of which is similar to that of the connector 2.1, with the difference that a solid foot 30 is provided instead of a web-shaped foot. This profile shows a cross-section Q2, in which the base 27 of the solid foot 30 extends out to the base part 42. A profile 2.2 can be used instead of profile 2.1 (not shown).

Figure 11:
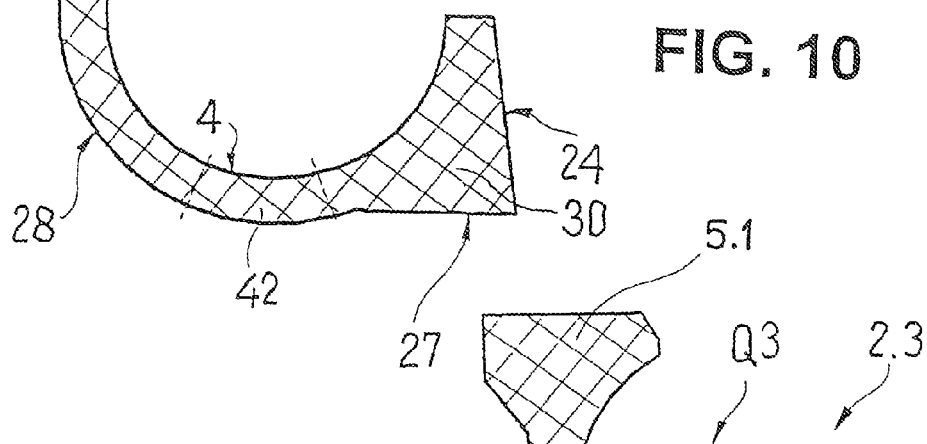
FIG. 11 shows a modification of the connector shown in FIG. 8, also in a cross-section of the profile.

A different, similar embodiment of a profile (reference numeral 2.3) shows a cross-section Q3 in FIG. 11. At the central segment, which is to say at the base part 42, the wall 3 has a flat lower surface 29. A bottom of the locking arm 14, which is not shown, has a matching surface (not shown) for the profile 2.3.

Figure 12:
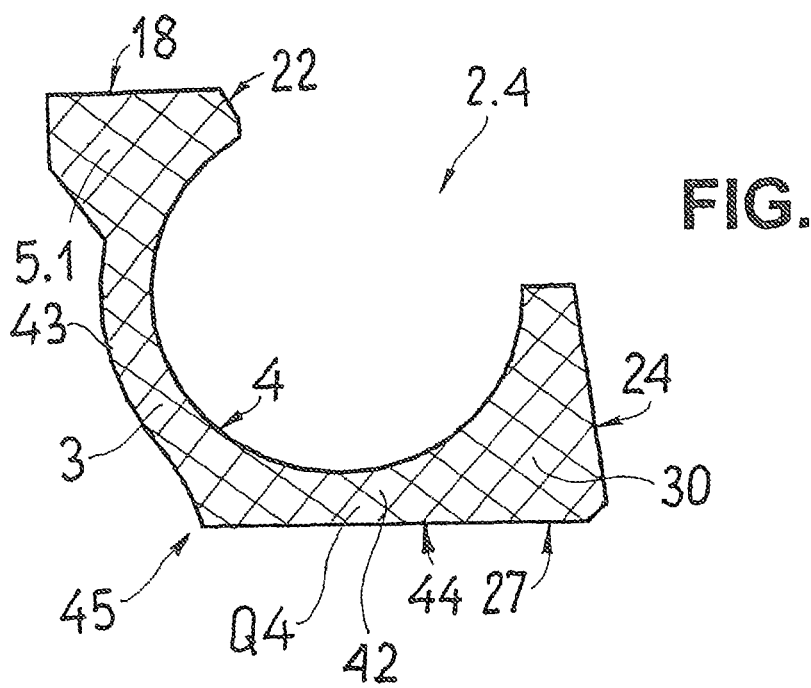
FIG. 12 shows a different connector comprising a solid foot, in a cross-section of the profile.
Figure 13:
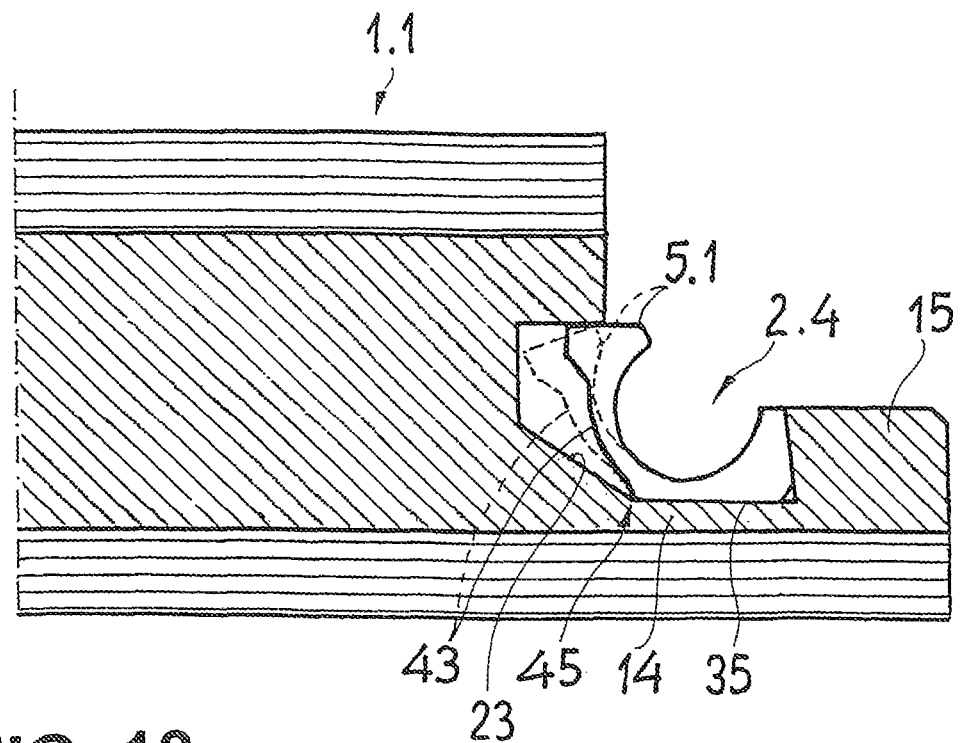
FIG. 13 shows a sectional view of the connector of FIG. 12, disposed between the lip and the lateral groove, of a building panel.

FIG. 12 shows a cross-section Q4 of a further profile 2.4, in which the solid foot 30 adjoins the arched, pivotable leg 43 via the lower base part 42 of the profile in such a manner that the lower, flat base 27 extends up to said leg 43. According to FIG. 13, the base 27 of the profile 2.4 is placed on the likewise flat bottom 35 of the locking arm 14. The width of the bottom 35 is equal to that of the base 27. Accordingly, the leg 43 can be pivoted about a transition region 45 of the profile, which corresponds to the transition of the bottom 35 into the beveled groove flank 23.

Figure 14:
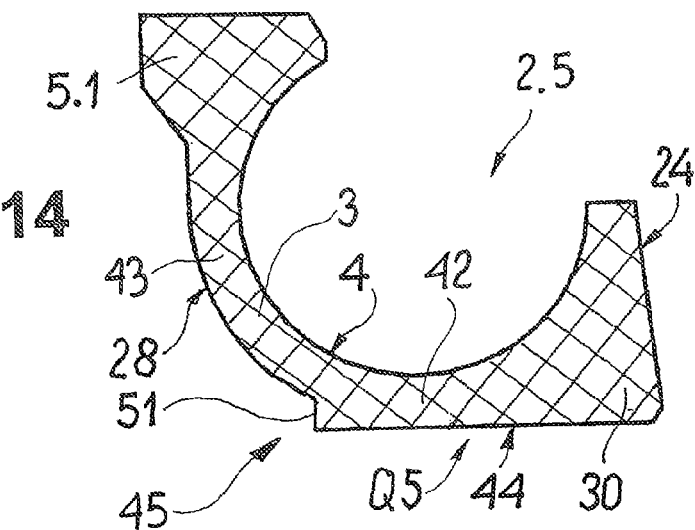
FIG. 14 shows a further connector comprising a solid foot, in a cross-section of the profile.
Figure 15:
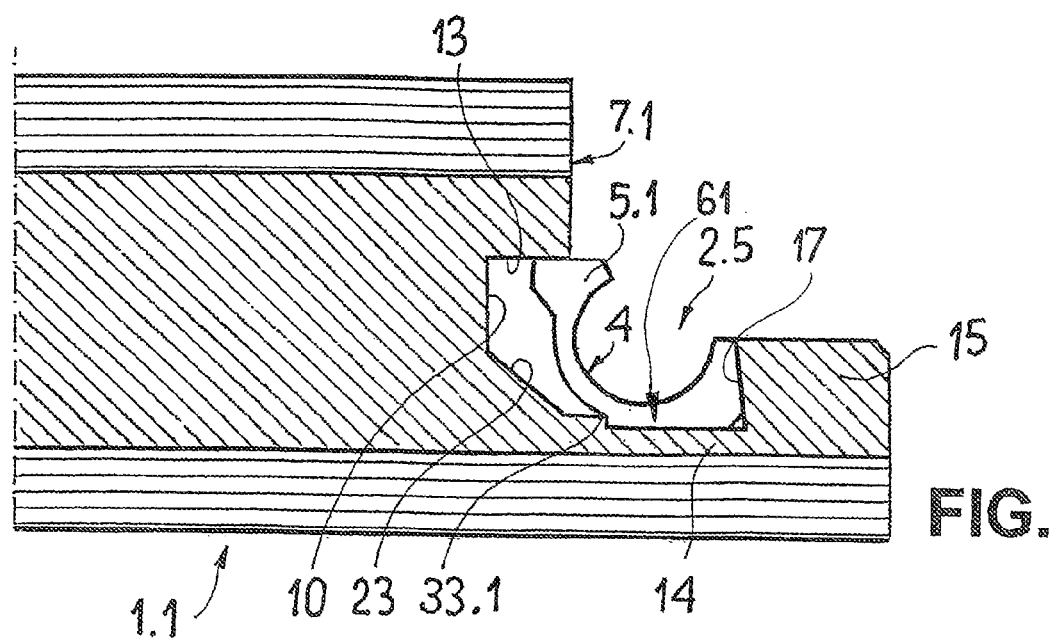
FIG. 15 shows a sectional view of the connector of FIG. 14, disposed between the lip and the lateral groove of a building panel.

FIG. 14 shows a cross-section Q5 of a different profile 2.5, which is almost identical to the profile 2.4. However, in the transition region 45 to the leg 43, the profile 2.5 is stepped. The base part 42 of the profile 2.5 has a flat, lower, outer surface 44, which extends between the side surface 24 of the lip 15 and a graduation 51 of the wall 3. The graduation 51 at the profile 2.5 matches a relatively low groove flank 33.1 of a groove 61, which is incorporated at the bottom of the locking arm 14 (compare FIG. 15). The head piece 5.1 of the connector 2.5, which is inserted in the groove 61, also presses against the upper groove flank 13 of the first groove 9. In this way, the connector 2.5 is placed with positional stability in the seat of the building panel 1.1, while the necessary mobility of the leg 43 carrying the headpiece 5.1 is maintained.

Figure 8:
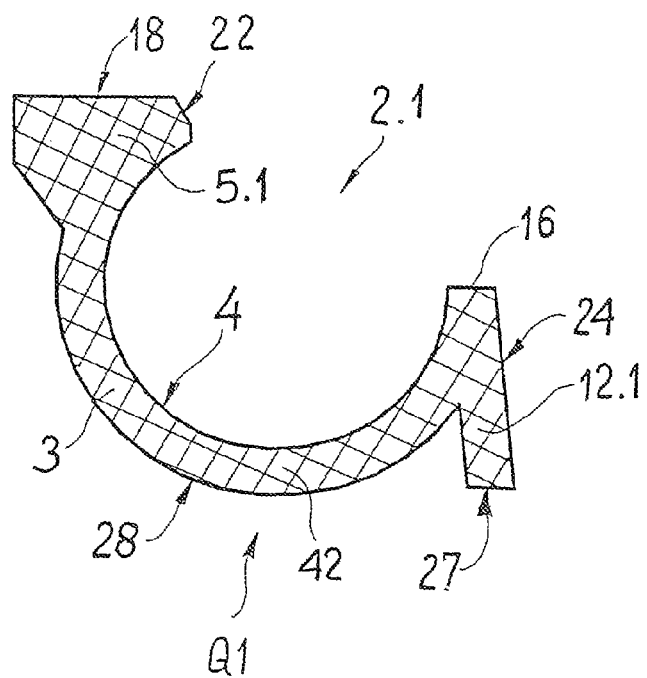
FIG. 8 shows a connector in a first embodiment, in a cross-section of the profile.
Figure 18:
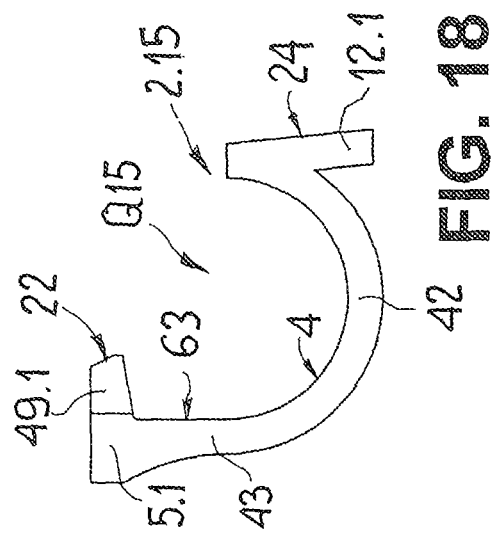
FIGS. 17 and 18 show a different connector, the head piece having tapered ends, in a top view of a side surface of the foot of the connector, and in a side view of the connector showing the profile.

FIG. 18 shows a further cross-section (reference symbol Q15) of a profile 2.15, which is a refinement of the profile 2.8 shown in FIG. 8. The partly cylindrical inner surface 4 of the profile 2.15 leads from the upper edge 16 of the foot 12.1 into a flat surface section 63, which extends up to the head piece 5.1.

Figure 17:
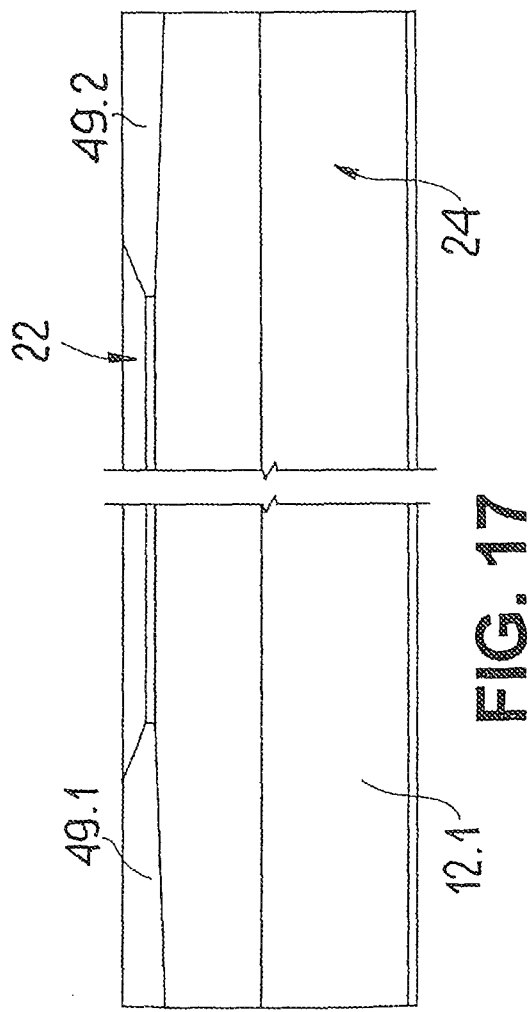
Figure 19:
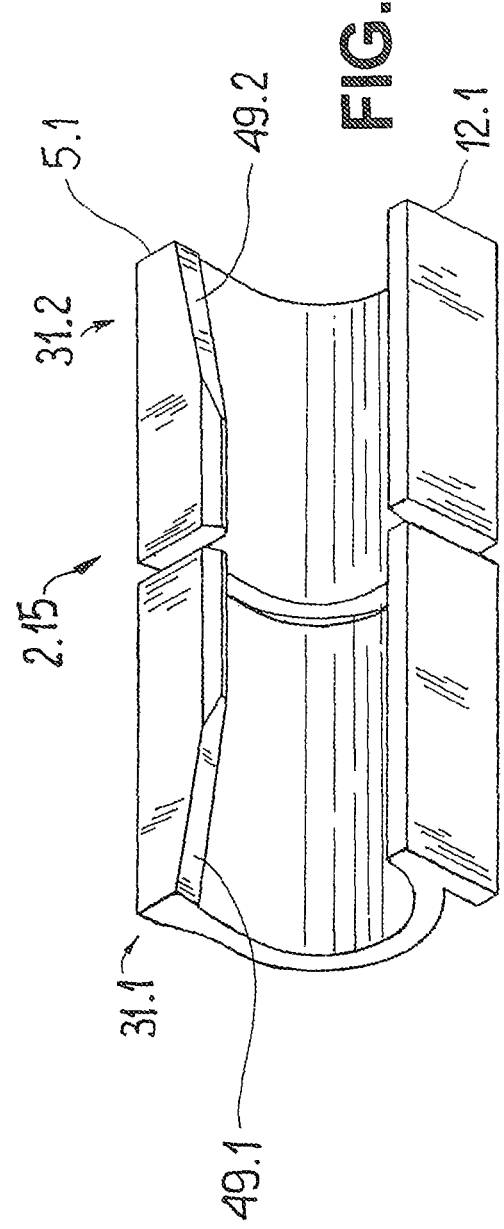
FIG. 19 shows a perspective view of the connector of FIGS. 17 and 18.

As shown in FIGS. 17 and 19, the head piece 5.1 is beveled at both ends 31, 32 of the profile 2.7, creating an insertion edge 49.1, 49.2.

Profile 2.15 is also shown in FIGS. 20, 21 and 22. A free inner edge 75, disposed at the head piece 5.1, extends rectilinearly along the total length L of the connector and does not have any insertion edges. Otherwise, the profile is identical to that shown in FIGS. 17 to 19.

Figure 23:
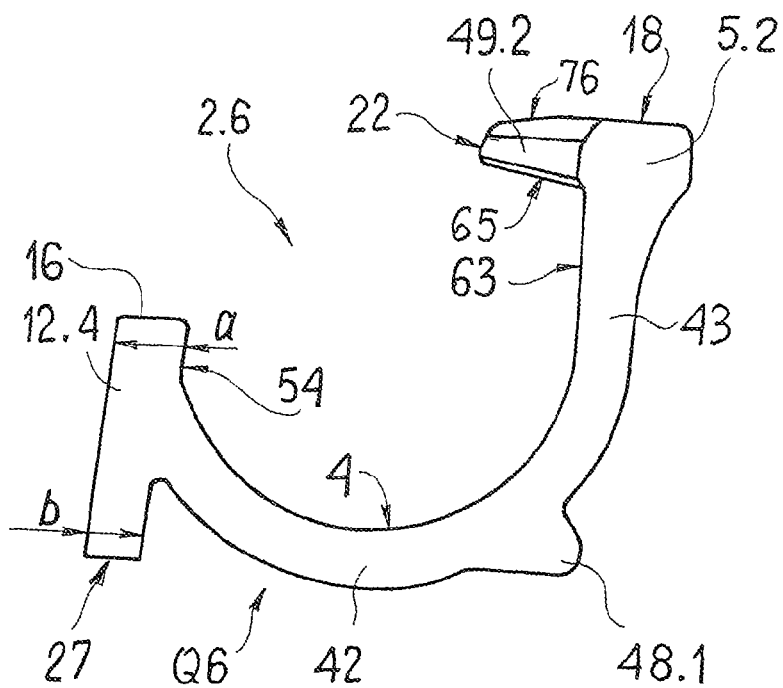
FIG. 23 shows a connector having a projection in the transition region of the base part thereof to the leg, in the cross-section of a profile.

FIG. 23 shows a cross-section Q6 of a further profile 2.6. The approximately partly cylindrical inner surface 4 of the profile 2.6, on the one hand, transitions into a planar, strip-shaped inner surface 54 in the elongated edge 16 of a foot 12.4 and, on the other, into the planar surface section 63 extending up to a head piece 5.2

The foot 12.4 has two thickness dimensions, a thickness "a" in the upper edge region and a smaller thickness "b" in the lower region ending with the base 27.

Figure 24:
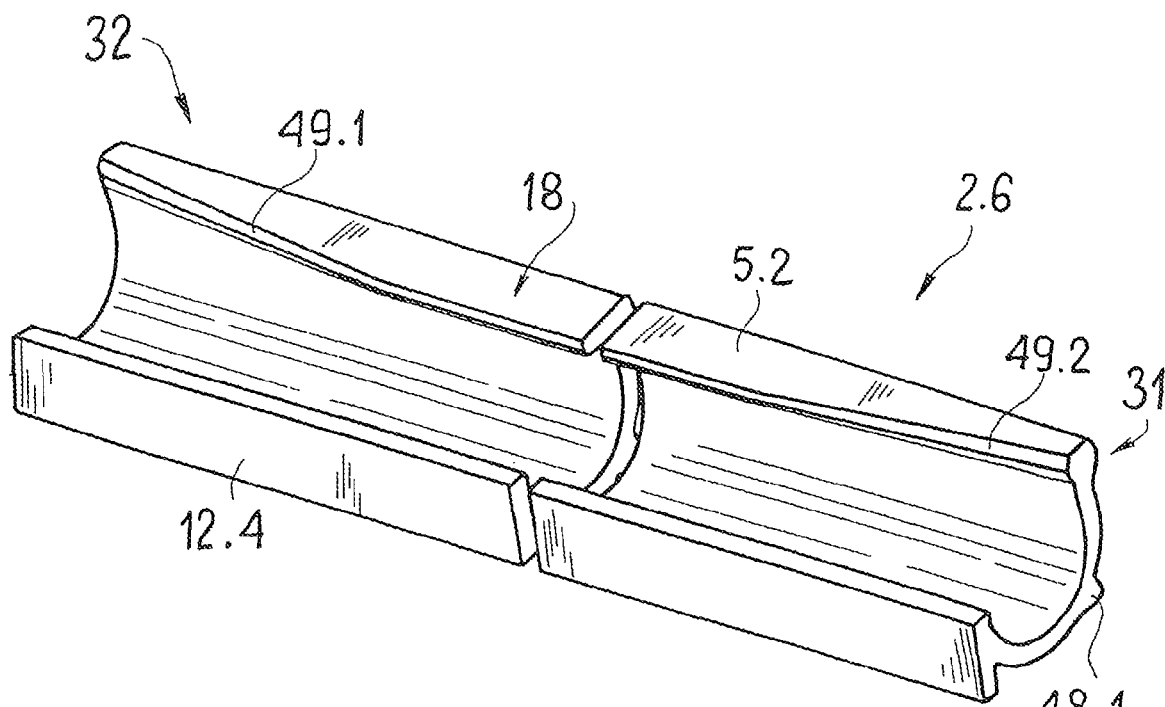
FIG. 24 shows a perspective view of the connector of FIG. 23.

The head piece 5.2 has the aforementioned bearing surface 18 and sliding surface 22; however, it is provided at both ends 31, 32 of the profile with beveled insertion edges 49.1, 49.2 (compare FIG. 24). In addition, it may be inferred from the cross-section Q6 that the upper planar bearing surface 18 transitions via a slightly declining section 76 into the sliding surface 22.

Figure 25:
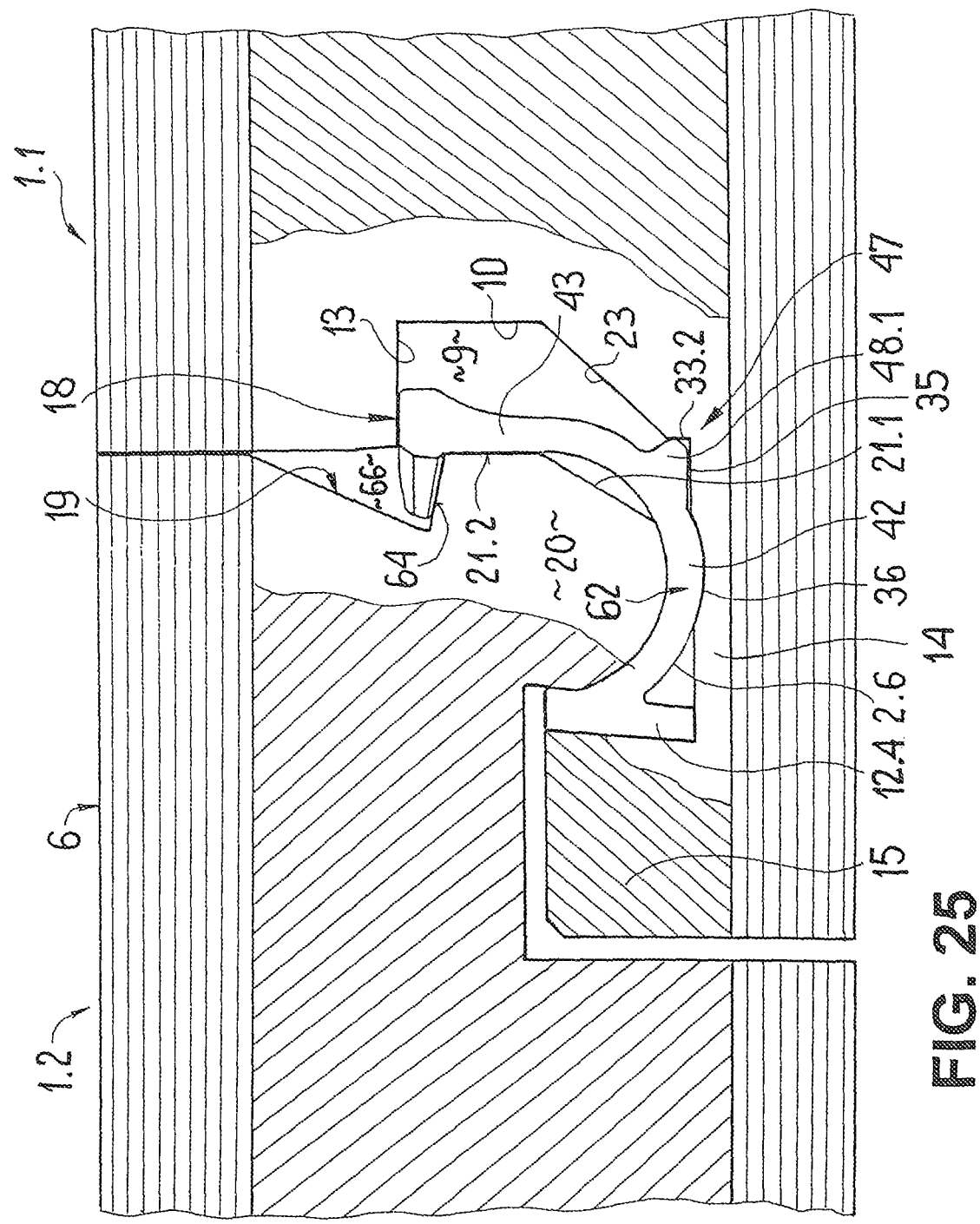
FIG. 25 shows a sectional view of two building panels, which are connected to one another, comprising an inserted connector of FIG. 25.

Furthermore, the profile 2.6 has an outwardly protruding bead-like projection 48.1, which extends in the longitudinal direction of the profile and is located in a transition region 47 of the base part 42 to the movable leg 43. As shown by FIG. 25, in the inserted state, the projection 48.1 is in contact with the bottom 35 of the locking arm 14 and with a relatively low flank 33.2 of a groove 62, which is disposed perpendicularly to the bottom 35. The groove 62 is defined by said groove flank 33.2, the inner surface 17 of the lip 15, and the bottom 35 with the depression 36.

The locking roller 20 (compare FIG. 25) is bounded by the beveled pressing surface 21.1, a second pressing surface 21.2, which adjoins the pressing surface 21.1 and is disposed perpendicularly to the usable surface 6, and by an inclined supporting surface 64, at which the lower surface 65 of the head piece 5.2 is supported. Together with the bevel 19, the inclined supporting surface 64 forms an asymmetric, V-shaped groove 66, into which the head piece 5.2 is introduced in such a manner that the bearing surface 18 thereof makes contact with the upper groove flank 13 of the first groove 9, and the lower bearing surface 65 thereof makes contact with the inclined supporting surface 64. In addition, the planar surface section 63 of the leg 43 is in contact with the pressing surface 21.2 of the locking roller 20 (after the locking roller 20 has been introduced; compare with FIG. 25).

FIG. 26 shows a cross-section Q7 of a further profile 2.7, which is provided with a projection 48.2 and has the parts described in FIG. 23, these being the head piece 5.2 and the foot 12.4. The outer surface 28 at the base part 42 continues up to a side surface 67 of the projection 48.2 at the free end. The projection 48.2 tapers in the direction of the transition region 47 of the leg 43 to the base part 42. The leg 43 itself has an upper straight leg section 68, carrying the head piece 5.2, and a lower straight leg section 69, which adjoins the base part 42. The two leg sections 68 and 69 are disposed at an obtuse angle $\epsilon$ with respect to one another, which, in the present case, is about 150°.

As shown by FIG. 27, the head piece 5.2 also has a rectilinearly extending inner edge 75.

Figure 28A:
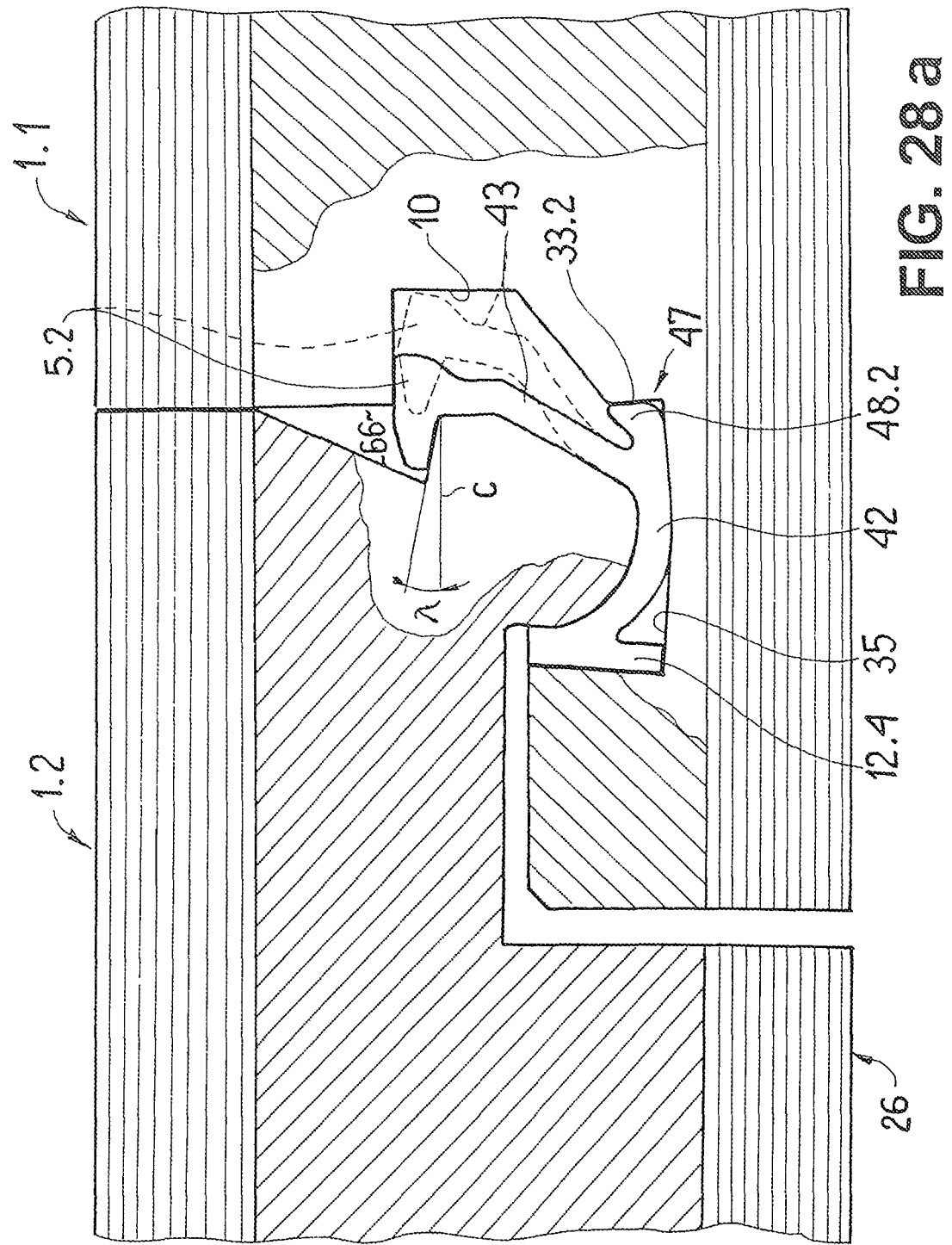
FIG. 28a shows a sectional view of two building panels, which are connected to one another, comprising an inserted connector from FIGS. 26 and 27.
Figure 28B:
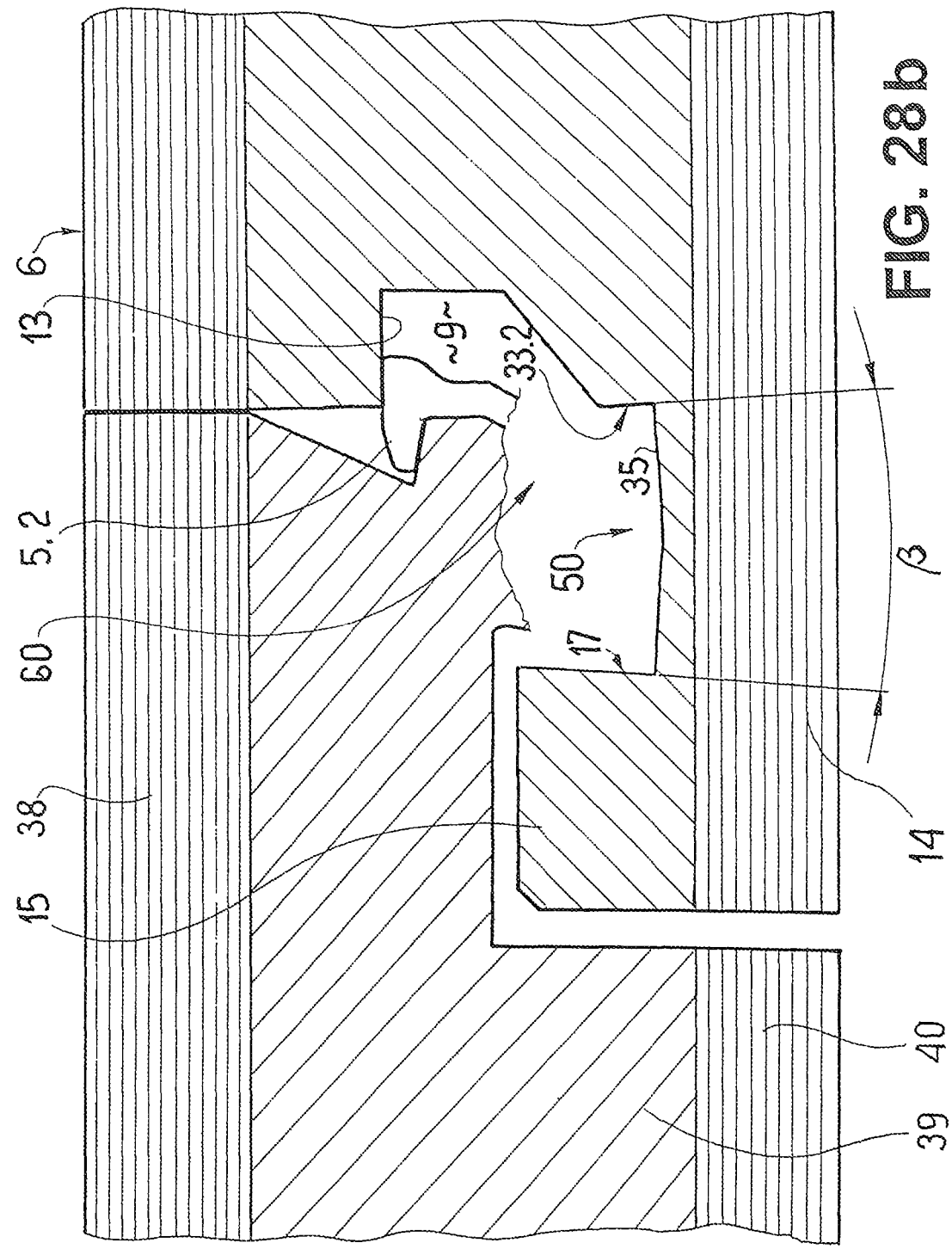
FIG. 28b shows a sectional view of the building panels of FIG. 28a, which are connected with one another, with an indicated concave bottom.

The use of the profile 2.7 is shown in FIGS. 28a and 28b.

The bottom 35 of the locking arm 14 is slightly concave and, together with the inner surface 17 of the lip 15 and the groove flank 33.2 located opposite the lip, forms the groove 50 (compare FIG. 28b). The groove flank 33.2 and the inner surface 17 of the lip 15 are inclined with respect to one another and form an acute angle β. In the present example, the acute angle β ranges between 5° and 10° and may vary slightly.

The seat 60 (compare FIG. 28b) for accommodating the connector 2.7 is also present in this embodiment. It is formed by the first groove 9 and by the inclined inner surface 17 of the lip 15 and by the bottom 35, and optionally by the groove 50 of the locking arm 14. The head piece 5.2 of the profile 2.7 inserted in the seat 60 presses against the upper groove flank 13 of the first groove 9.

The structure of the locking roller 20 (compare FIG. 28a) is similar to the embodiment of FIG. 25. However, not only the inner surface 4 of the profile 2.7, but also sections 68 and 69 of the leg 43 are adapted to the shape of the locking roller 20. The head piece 5.2 engages with the V-shaped groove 66 and the lower bearing surface 65 thereof is supported at the supporting surface 64 of the groove 66. The supporting surface 64 is inclined at an acute angle λ with respect to the base surface 26. A straight line c, forming the boundary of the angle λ (compare FIG. 28a), represents the base surface 26. In the present case, the angle λ amounts to approximately 10°. This same arrangement of the head piece 5.2 in the inserted state also applies to the embodiment of FIGS. 23 to 25.

In this way, the connector 2.7 is accommodated with positional stability in the seat 60 of the building panel 1.1, while the required mobility of the leg 43 thereof carrying the head piece 5.2 is maintained.

Figure 29:
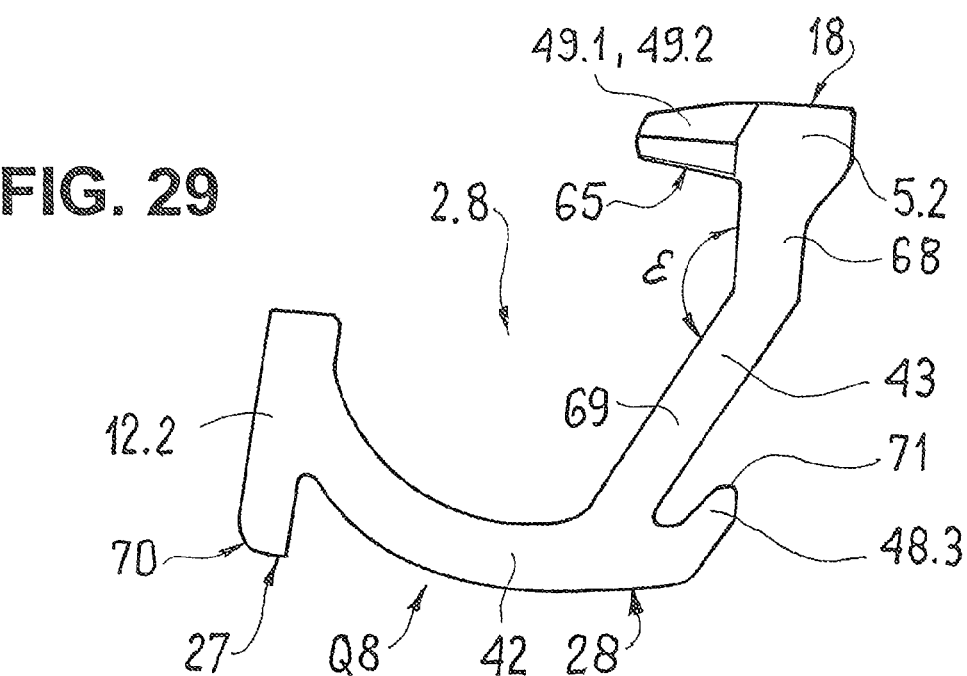
FIG. 29 shows a further connector having an angled projection and a rounded foot, in a cross-section of the profile.

FIG. 29 shows a cross-section Q8 of a profile 2.8, which is similar to profile 2.7. Identical parts are denoted by the same reference numerals. The profile 2.8 has a foot 12.2, which differs from the foot 12.4 by a rounding 70. The free, bent end 71 of an outwardly protruding projection 48.3 points upward. The projection 48.3 may be referred to as being web-shaped.

Figure 30:
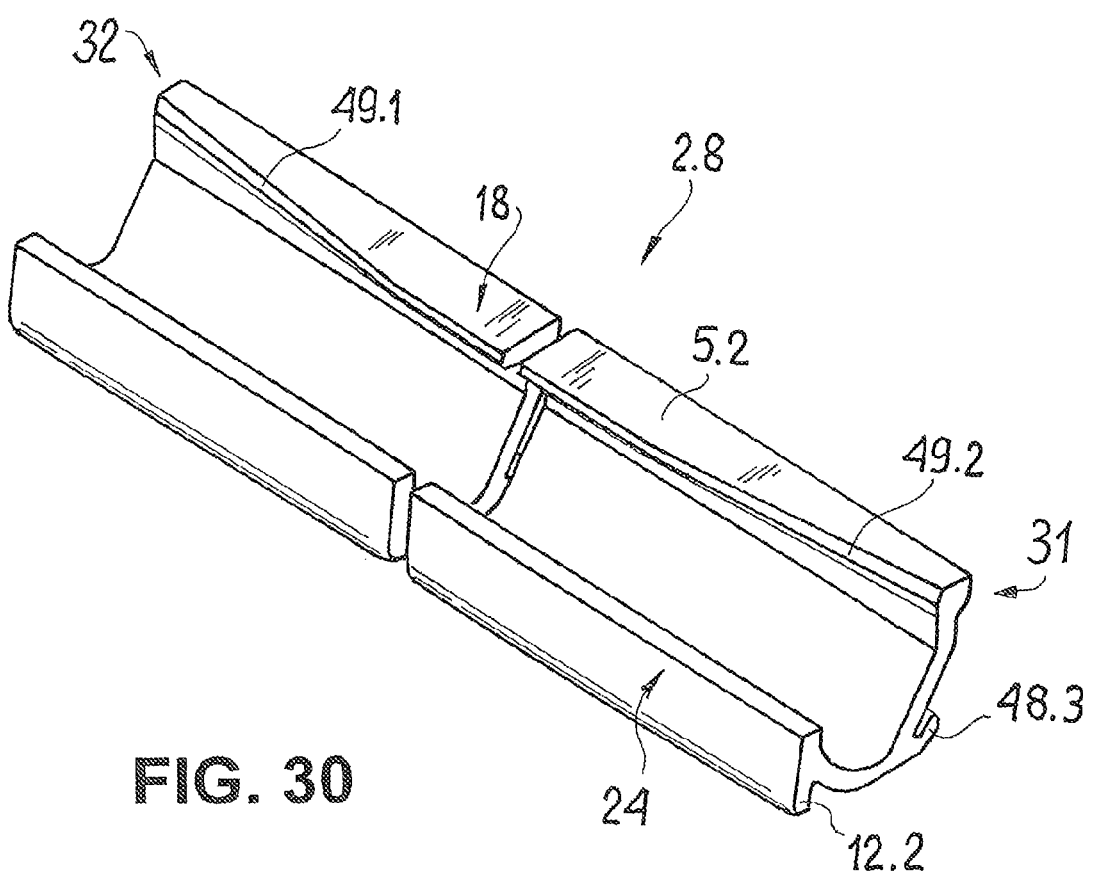
FIG. 30 shows a perspective view of the connector of FIG. 29.

As shown in FIG. 30, the head piece 5.2 is beveled at both ends 31, 32 of the profile 2.8 in each case by an insertion edge 49.1, 49.2.

Figure 31:
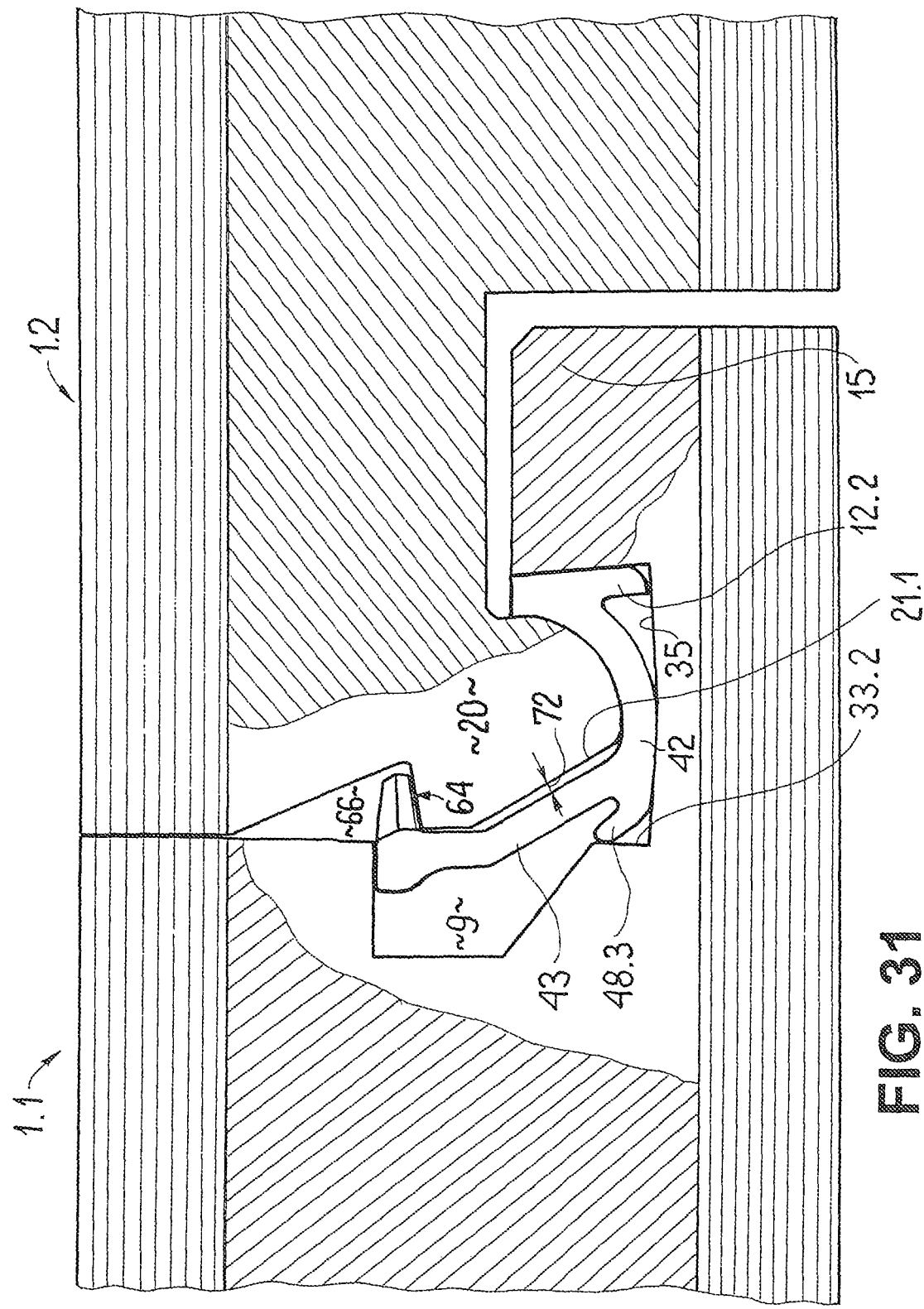
FIG. 31 shows a sectional view of two building panels, which are connected to one another, comprising an inserted connector of FIG. 29.

The use of the profile 2.8 is shown in FIG. 31. As in the embodiment of FIG. 28a, the profile 2.8 is pressed with the base part 42 thereof into the groove 50. In the inserted state, the head piece 5.2 engages with the V-shaped groove 66 and the lower bearing surface 65 thereof is supported at the supporting surface 64 of the groove 66. A slight gap 72 remains between the beveled pressing surface 21.1 of the locking roller 20 and the leg 43.

Figure 32:
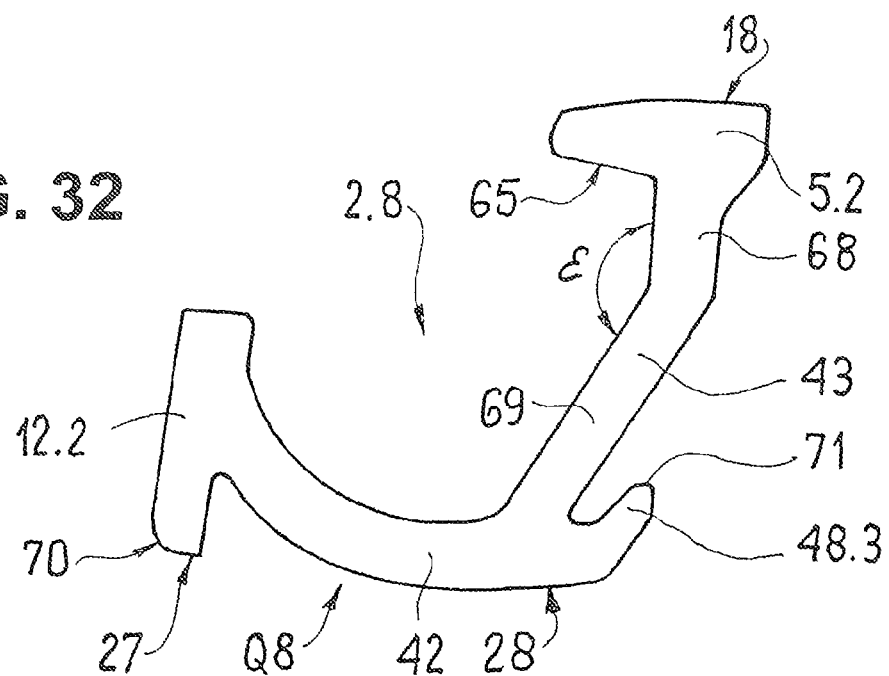
FIG. 32 shows the connector of FIG. 29, however without tapered ends at the head piece, in a cross-section of the profile.
Figure 33:
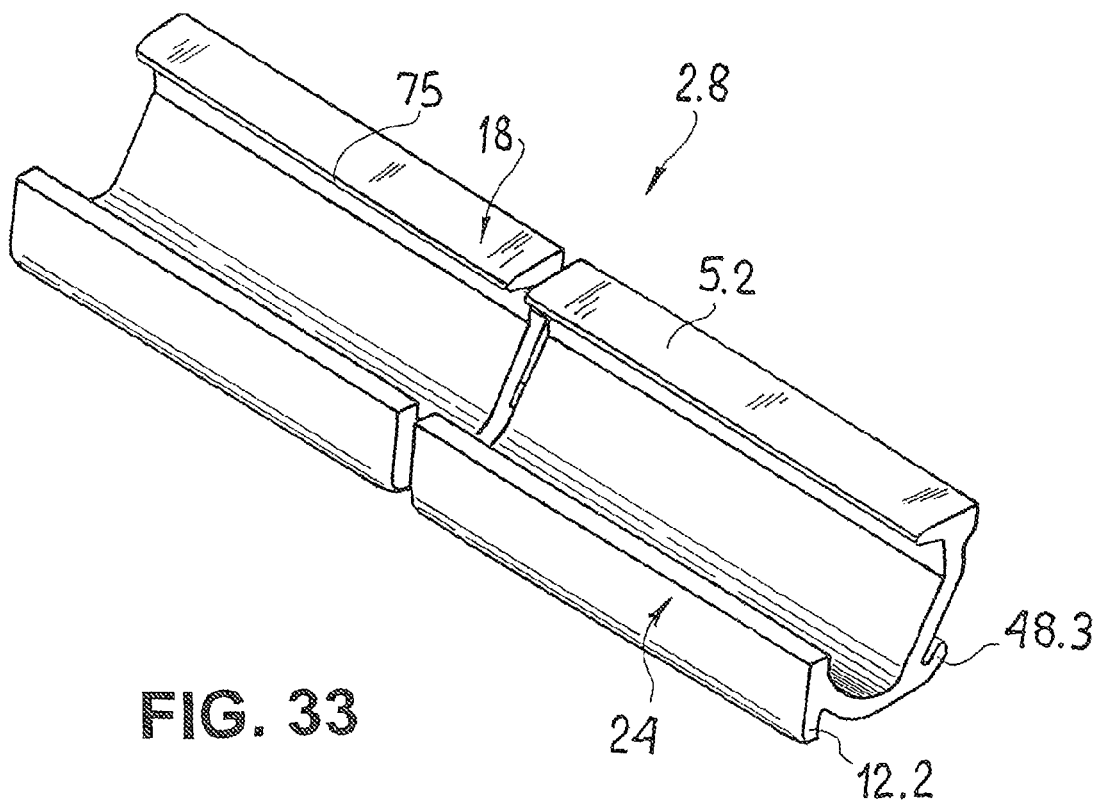
FIG. 33 shows a perspective view of the connector of FIG. 32.

In FIGS. 32 and 33, the same profile 2.8 is shown without the insertion edges. Accordingly, the head piece 5.2 has the rectilinear inner edge 75.

The figures below represent particularly advantageous embodiments of the invention.

For example, FIG. 34 shows a cross-section Q9 of a profile 2.9 which, instead of the projection, has an outwardly protruding, stabilizing web 55, which is considerably higher than the projection 48.3 shown in FIG. 29. The web 55 can be elastically deformed so that, if in the inserted state, it may support itself, under tension, with the outer surface 73 thereof at the beveled flank 23 of the groove 9. This situation is apparent from FIG. 35. The leg 43 ends with a head piece 5.3, which comprises the upper bearing surface 18 as well as a rounded sliding surface 53, which is shown clearly in FIGS. 34 and 36. The head piece 5.3 is distinguished by the aforementioned lower bearing surface 65, which, in the installed state (see FIG. 35), is inclined slightly upward and forms the same angle λ shown in FIG. 28a.

The base part 42 of the head piece 5.3 ends with a foot 12.3, the upper inner surface 54 of which, together with the side surface 24, forms an acute angle γ. Accordingly, the foot 12.3 tapers in the upper region thereof in the direction of the edge 16. The inner surface 4 of the wall 3 as well as the rounded lower surface of the locking roller 20 is partially elliptic. The locking roller 20 is bounded, on one hand, by the flat pressing surfaces 21.1; 21.2 and, on the other, by a flat inner surface 59, which transitions into the aforementioned downwardly open recess 37 at the building panel 1.2.

If the locking roller 20 moves downward, the pressing surfaces 21.1; 21.2 thereof press against the rounded sliding surface 53 of the head piece 5.3, until the latter engages with the trapezoidal groove 52 and the leg 43 is brought into contact with the pressing surface 21.2. At the same time, the inner surface 59 of the locking roller 20 is in contact with the upper inner surface 54 of the foot 12.3. Together with the usable surface 6 of the building panels, the mutually contacting inner surfaces 54; 59 form an obtuse angle $δ_2$, which is shown in FIG. 35. The recess 37 widens slightly downward in the upper region thereof.

Figure 37:
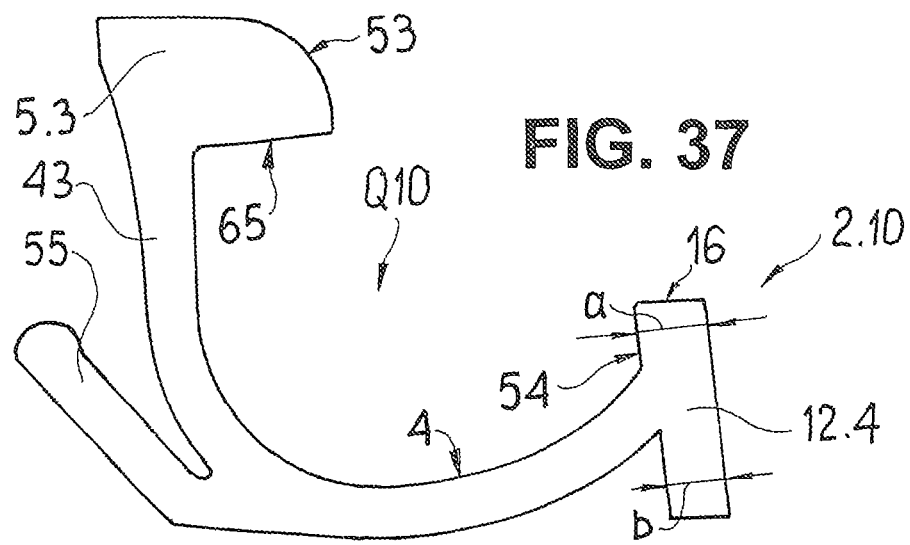
FIG. 37 shows the connector of FIG. 34, however comprising a modified foot, in a cross-section of the profile.

A cross-section Q10, shown in FIG. 37, describes a profile 2.10 in which the foot 12.4, which is already shown in FIG. 23, is present. Otherwise, the profile 2.10 comprises the same parts as the profile 2.9 (compare FIG. 34) and is denoted by the same reference symbols.

Figure 38:
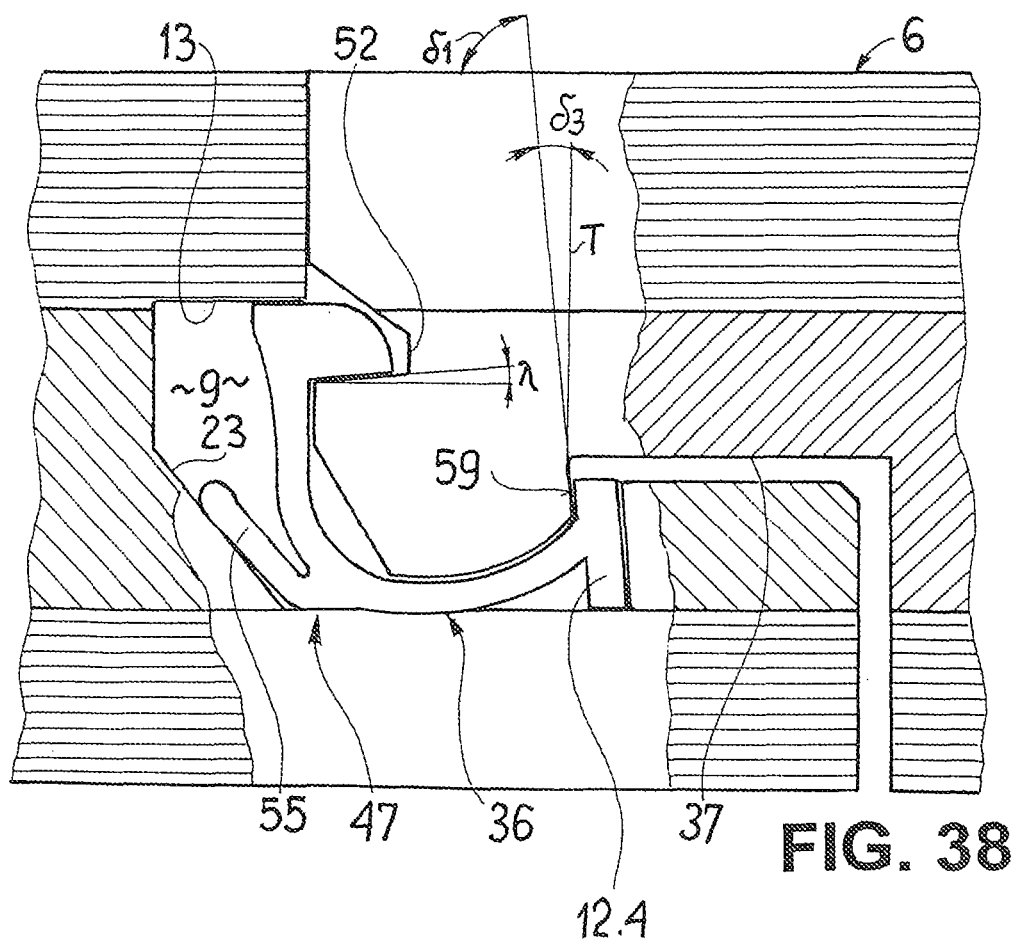
FIG. 38 shows a partial section of two building panels, which are connected to one another, comprising an inserted connector of FIG. 37.

The head piece 5.3 likewise has the lower bearing surface 65, which is inclined slightly upward and, in the inserted state (compare FIG. 38), is adapted to the inner surface 59 of the locking roller 20 and In contact therewith. At the same time, the inner surface 59 of the locking roller 20 forms a groove flank of the recess 37. As is evident from FIG. 38, the recess 37 tapers slightly downward. As a result, the two mutually contacting inner surfaces 54, 59 are disposed at an acute angle $δ_1$ with respect to the usable surface 6. If a line T is drawn perpendicularly to the usable surface 6, said inner surfaces 54, 59 form an acute, complementary angle $δ_3$ with respect to the perpendicular line T, the sum of the two angles $δ_1$ and $δ_3$ being 180°.

The lower bearing surface 65 of the rounded head piece 5.3 is inclined at the aforementioned acute angle λ with respect to the base surface 26.

Figure 39:
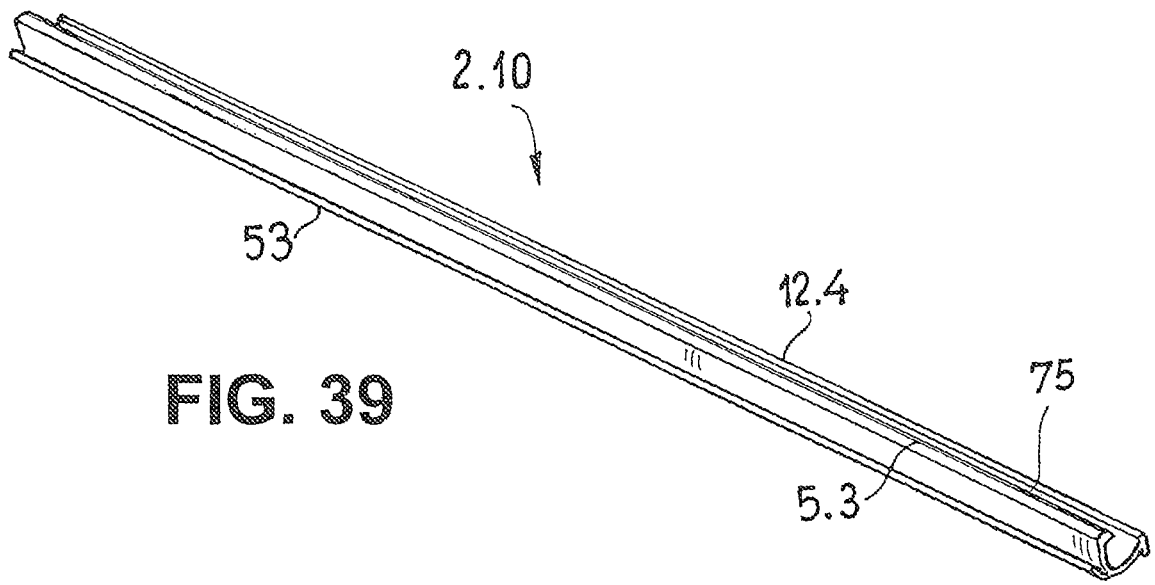
FIGS. 39 and 40 show two perspective representations of the connector of FIG. 37.
Figure 40:
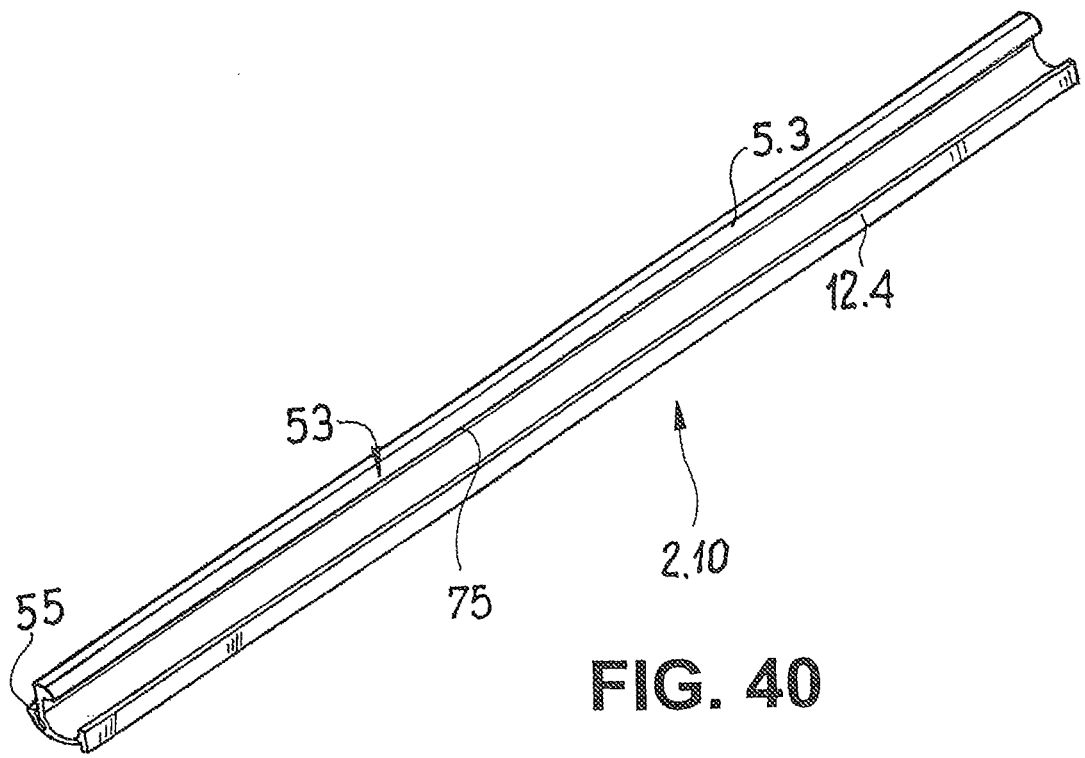

In FIGS. 39 and 40, the profile 2.10 is shown in two perspective views. The figures show that the head piece 5.3 likewise has the rectilinear inner edge 75 without insertion edges.

Figure 41:
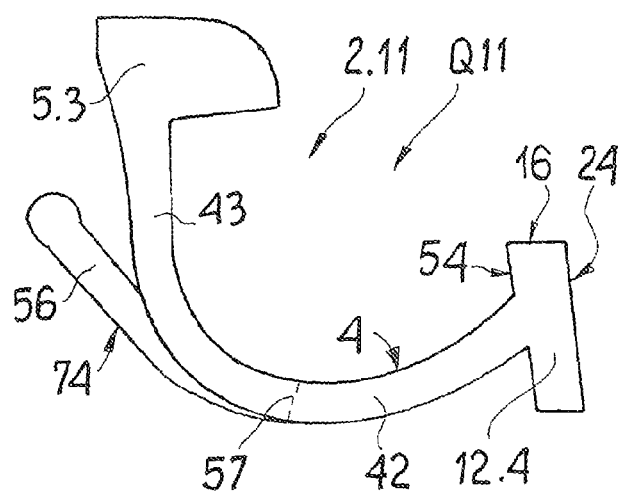
FIG. 41 shows a connector having downwardly protruding tongues, in a cross-section of the profile.

FIG. 41 shows a cross-section Q11 of a further profile 2.11. The profile 2.11 is shown in further FIGS. 43 and 44 in perspective representations and in FIGS. 45, 46 in top views of the interior of the profile and of the upper side of the head piece 5.3. The inner surface 4 of the wall 3 as well as the rounded lower surface of the locking roller 20 are partly elliptical.

An essential feature of the profile 2.11 are outwardly protruding, elastically deformable, rectangular tongues 56.1, 56.2, 56.3, 56.4, 56.5, which, starting from a transition region 47 (compare FIG. 42) of the base part 42 towards the movable leg 43, are located obliquely with respect to the undeformed leg 43. The tongues 56.1, 56.2, 56.3, 56.4, 56.5 are produced in one piece with the profile 2.11 in an injection molding process. Moreover, it is advantageous for the downwardly protruding tongues 56.1, 56.2, 56.3, 56.4, 56.5 to each form a window 58.1, 58.2, 58.3, 58.4, 58.5 in the material of the wall 3.

Figure 43:
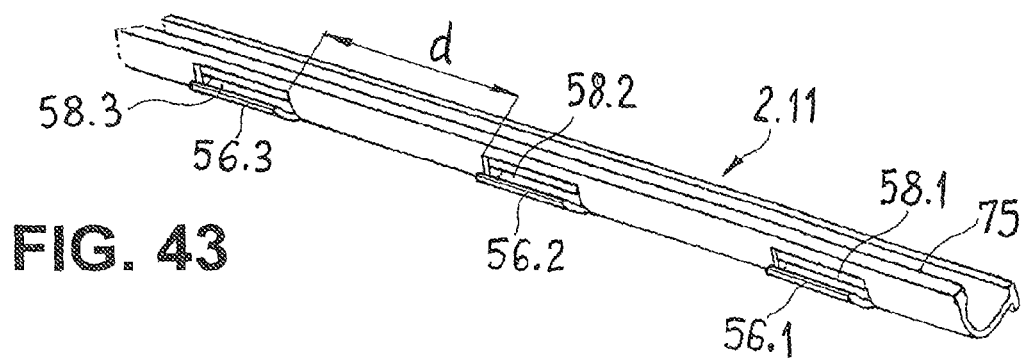
FIG. 43 shows a perspective view of the connector of FIG. 41, with visible tongues.
Figure 44:
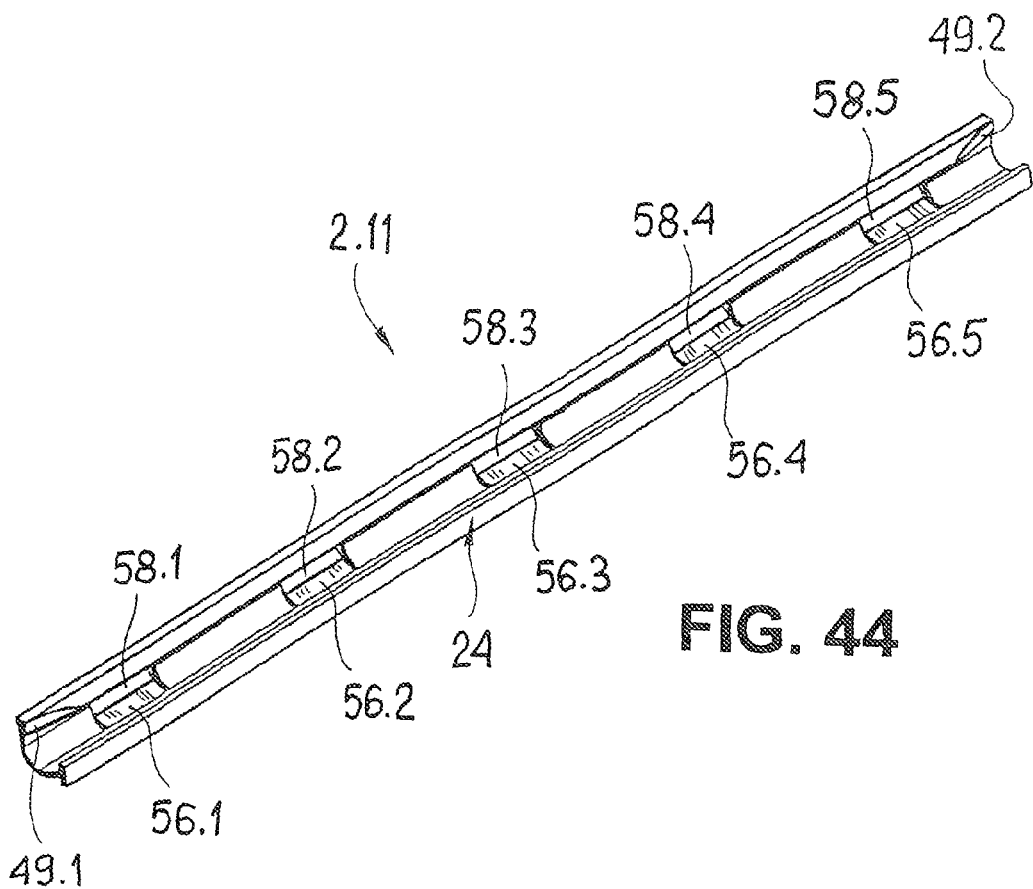
FIG. 44 shows the connector of FIG. 41 in a view of the inner side thereof.
Figure 45:
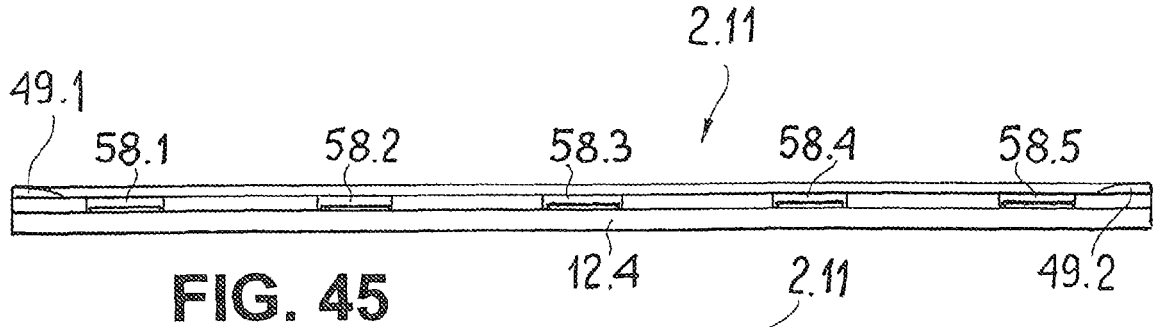
FIGS. 45 and 46 shows the connector of FIG. 41 in a top view of the side surface of the foot of the connector, as well as in the top view from above of the head piece.
Figure 46:
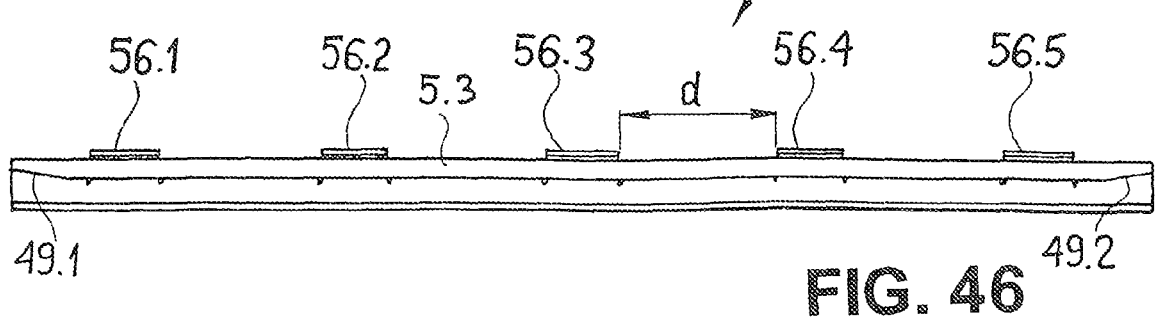

As shown by FIGS. 44, 45 and 46, the profile 2.11 is provided with two insertion edges 49.1, 49.2. No insertion edges are provided for in the embodiment of profile 2.11 in FIG. 43.

Accordingly, the head piece 5.3 has the rectilinear inner edge 75. Only three tongues 56.1, 56.2, 56.3 and three windows 58.1, 58.2, 58.3 are shown in FIG. 43.

The protruding tongues 56.1, 56.2, 56.3, 56.4, 56.5 are disposed at the same inner distance d (compare FIGS. 43 and 46) from one another along the profile.

Figure 42:
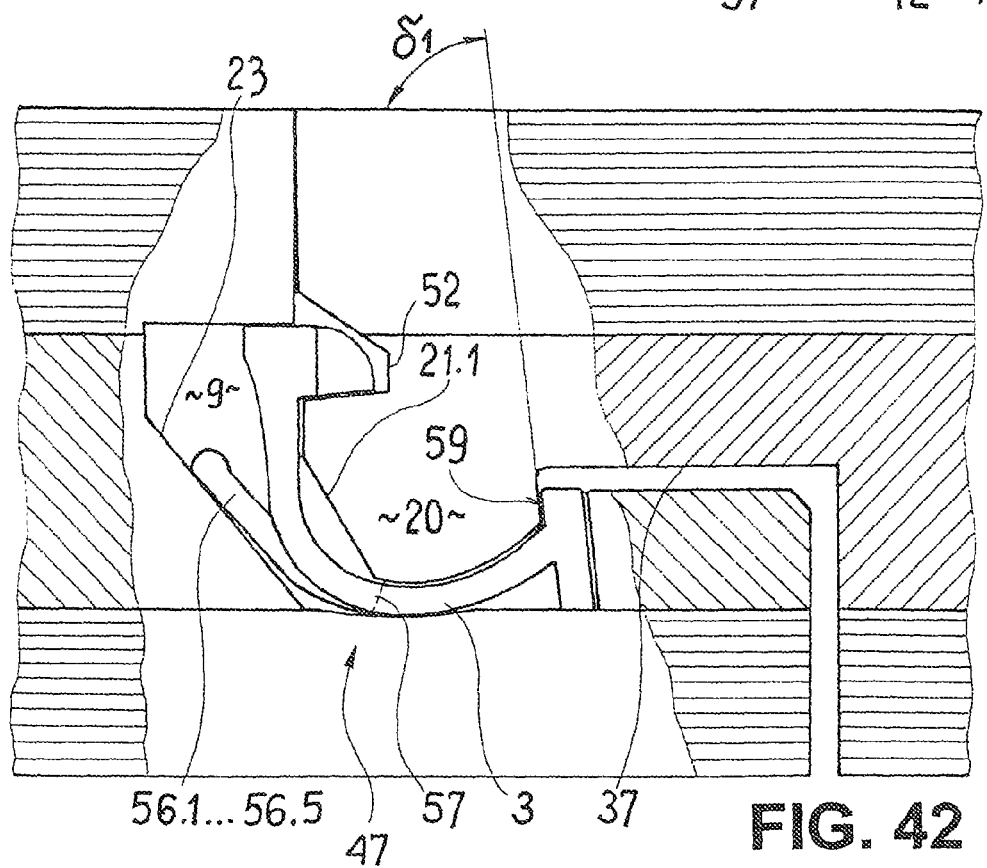
FIG. 42 shows a partial section of two building panels, which are connected to one another, comprising an inserted connector of FIG. 41.

The use of profile 2.11 is shown in FIG. 42. The locking roller 20 presses against the base part 42 of the profile, while the head piece 5.3 engages with the trapezoidal groove 52 and the leg 43 is in contact with the pressing surface 21.2. The mutually contacting inner surfaces 54; 59, together with the usable surface 6 of the building panel, form an acute angle $\delta_1$ which is shown in FIG. 42.

The recess 37 tapers slightly downward. The elastic tongues 56.1, 56.2, 56.3, 56.4, 56.5 are deformed and supported under tension at the beveled flank 21 of the first groove 9.

Figure 47:
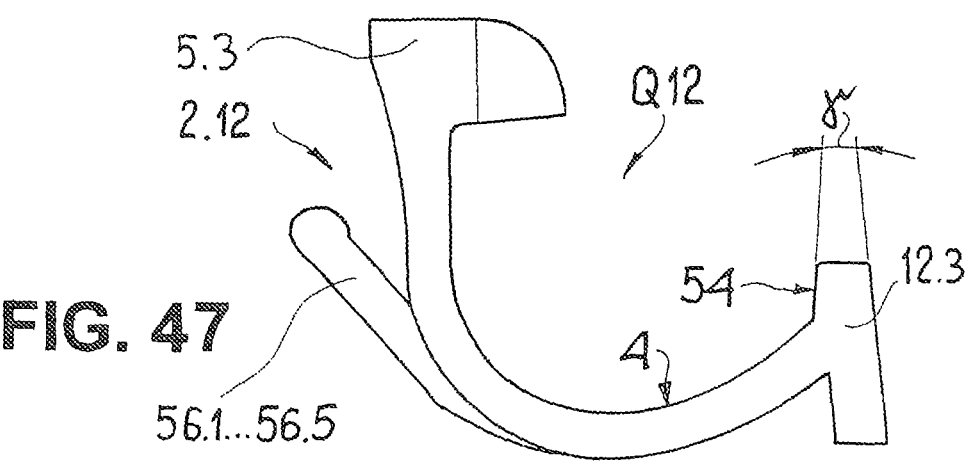
FIG. 47 shows the connector of FIG. 41, however comprising a modified foot, in a section of the profile.

FIG. 47 shows a cross-section Q12 of a further profile 2.12, which is provided with tongues 56.1, 56.2, 56.3, 56.4, 56.5. The difference over the profile 2.11 shown in FIG. 41 is that the foot 12.3 tapers upward in the upper region in much the same way as in the case of profile 2.9 (compare FIG. 34).

Figure 48:
FIG. 48 shows a partial section of two building panels, which are connected to one another, comprising an inserted connector of FIG. 47.

The inner surface 4 of the wall 3 of the profile 2.12 and the rounded lower surface of the locking roller 20 are partly elliptical (compare FIG. 48).

Figure 49:
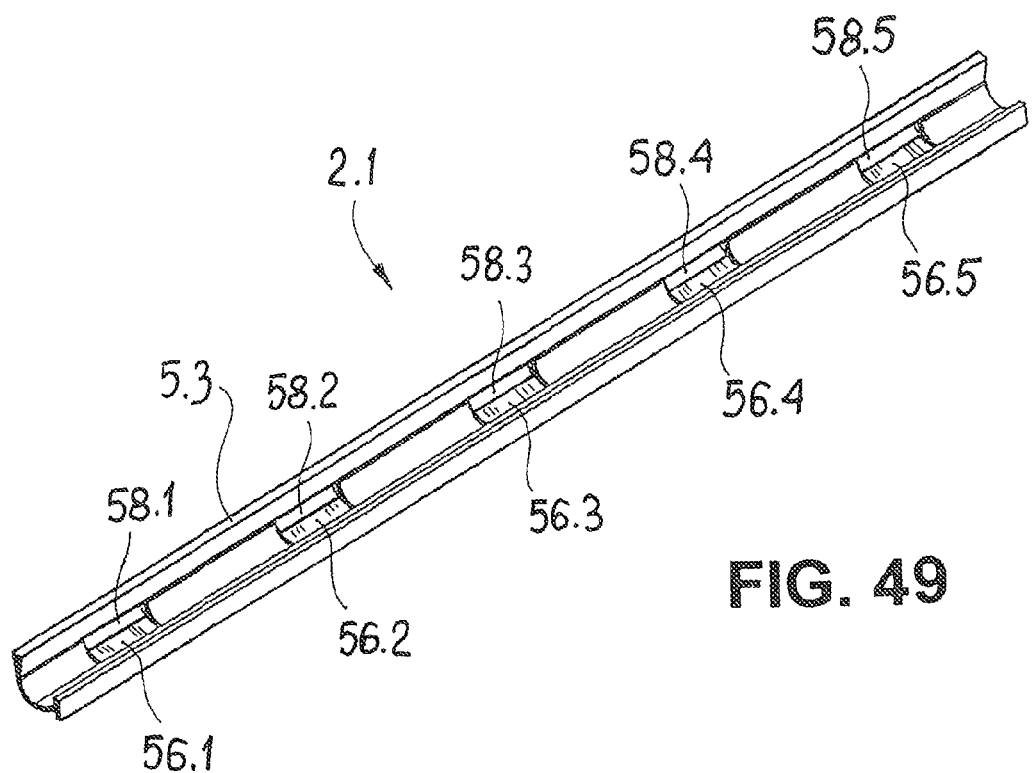
FIG. 49 shows the connector of FIG. 47 in a view of the inner side thereof.
Figure 50:
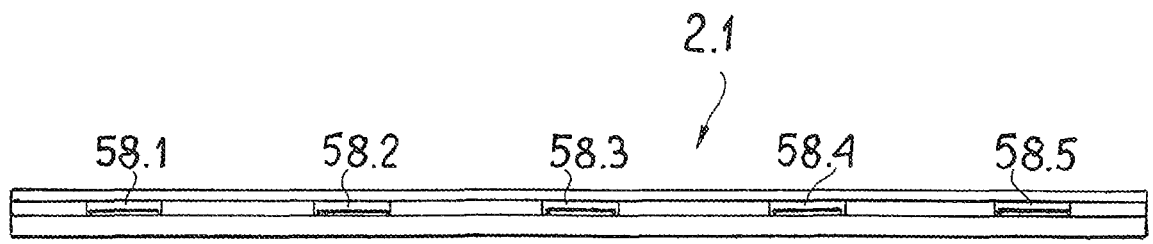
FIGS. 50 and 51 shows the connector of FIG. 47 in a top view of the side surface of the foot of the connector, as well as in a top view from above of the head piece.
Figure 51:
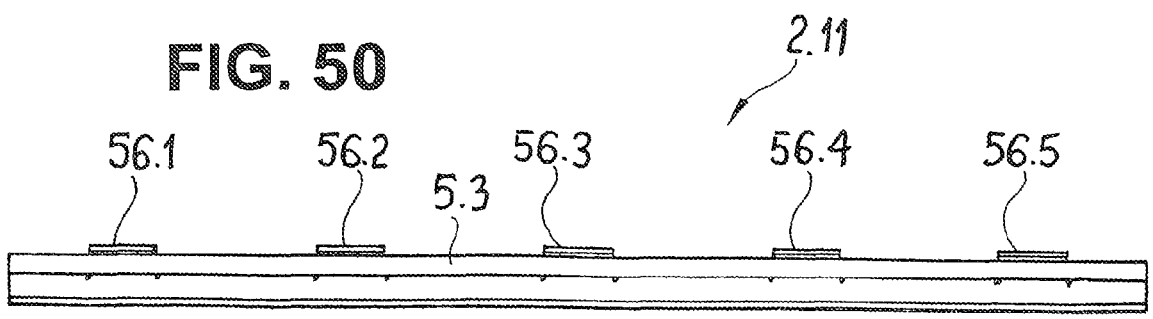

FIG. 49 shows a a perspective view of the profile 2.12 in the direction of the inside of the profile and, FIGS. 50, 51 show top views of the interior of the profile and of the upper side of the head piece 5.3. The figures show that the head piece 5.3 has the rectilinear inner edge 75 without insertion edges.

The inserted profile 2.12 is shown in FIG. 48. Together with the inner surface 59 of the locking roller 20, the inner surface 54 of the foot 12.3 forms the obtuse angle $\delta_2$. The elastic tongues 56.1, 56.2, 56.3, 56.4, 56.5, under tension, are supported at the beveled flank 23 of the first groove 9.

Figure 52:
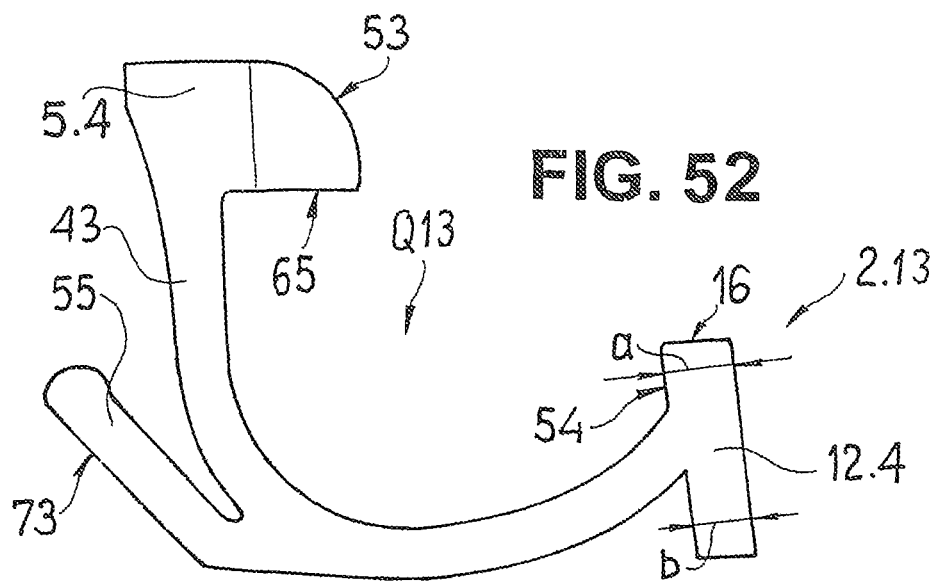
FIG. 52 shows the connector of FIG. 37, however comprising a modified head piece, in a section of the profile.
Figure 53:
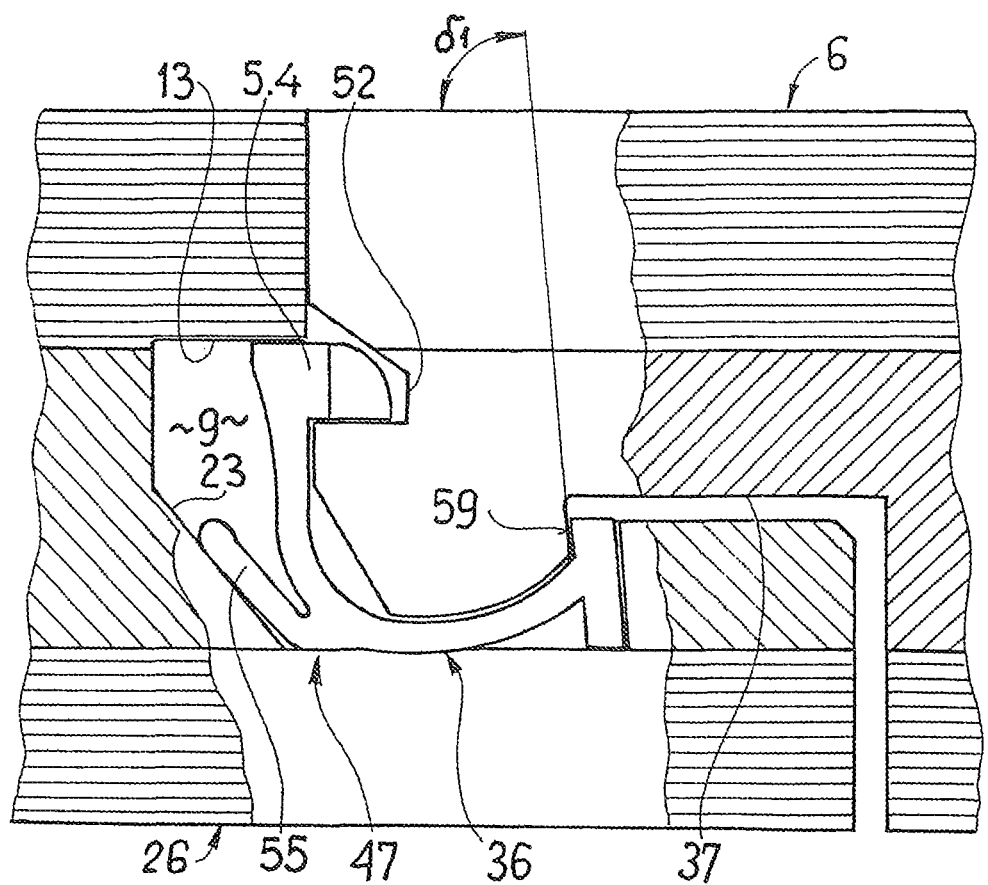
FIG. 53 shows a partial section of two building panels, which are connected to one another, comprising an inserted connector of FIG. 52.

FIG. 52 shows a further cross section Q13 of a profile 2.13, which is very similar to the cross section Q10 shown in FIG. 37 (profile 2.10). Profile 2.13 has a rounded head piece 5.4, the lower bearing surface 65 of which is disposed at an angle with respect to the flat section 63 on the inside of the leg 43. In the inserted state (compare FIG. 53), the bearing surface 65 of the head piece 5.4 extends in a plane-parallel manner to the usable or base surface 6; 26. In addition, together with the usable surface 6 of the building panel, the mutually contacting inner surfaces 54; 59 form the previously shown acute angle $\delta_1$. A different arrangement is possible, for example, with an obtuse angle $\delta_2$ for the mutually contacting inner surfaces 54; 59.

Figure 54:
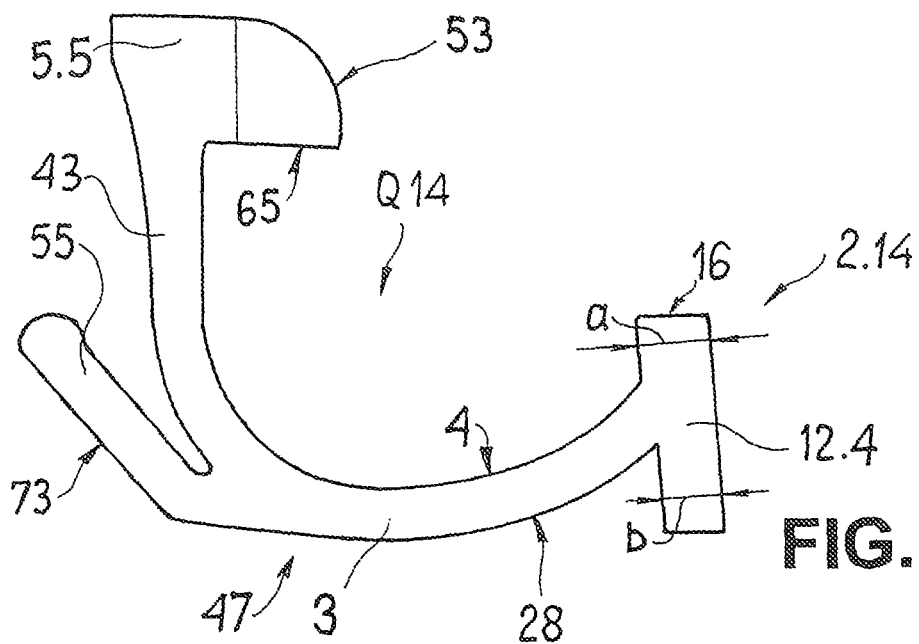
FIG. 54 shows the connector of FIG. 37, however with a different variation of the head piece, in a section of the profile.

FIG. 54 shows a cross-section Q14 of a profile 2.14, the details of which may be derived from the profile 2.10 (compare FIG. 37). The difference between the two profiles is that, in contrast to profile 2.10, profile 2.14 comprises a head piece 5.5 having a bearing surface 65 inclined downward in the direction of the foot 12.4.

Figure 55:
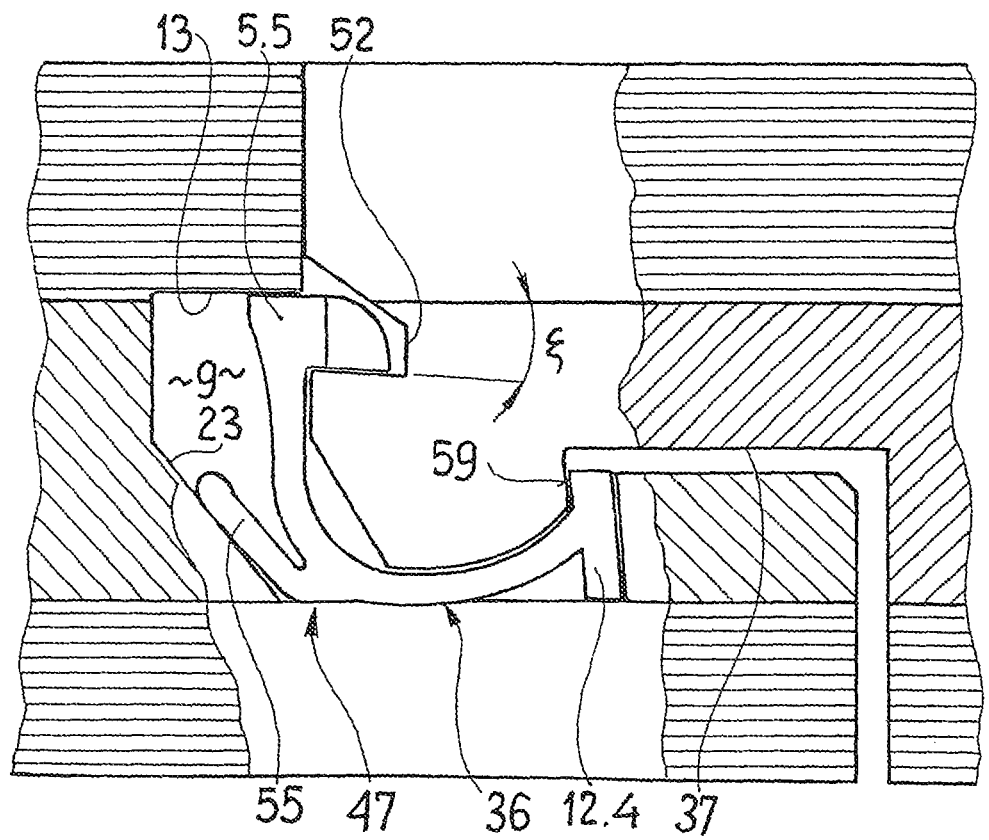
FIG. 55 shows a partial section of two building panels, which are connected to one another, comprising an inserted connector of FIG. 54.

In the inserted state of the connector (compare FIG. 55), the bearing surface 65 forms an acute angle $\xi$ together with the usable or base surface 6, 26 of the building panels. The magnitude of the angle $\xi$ corresponds approximately to the magnitude of the angle $\lambda$ shown in FIG. 38. Accordingly, the angle $\xi$ is approximately 3° to 5° in the present case and may, of course, vary. However, with a view to the advantageous self-locking action of the two surfaces in contact with each other, the angle $\xi$ should be at least 2°.

The inner surface 4 and the outer surface 28 of the wall 3 extend partially elliptically, starting from the foot 12.4, up to the transition 47 to the movable leg 43.

All profiles provided with the projections 48.1, 48.2, 48.3, with the webs 55 and with the tongues 56.1, 56.2, 56.3, 56.4, 56.5 improve the positional stability of these profiles before and after introduction of the locking roller 20 into the inner space spanned by the inner surface 4 of the respective profile.

LIST OF REFERENCE SYMBOLS

1.1; 1.2 building panel
2.1; 2.2; 2.3; 2.4 connector
2.5; 2.6; 2.7; 2.8 connector
2.9; 2.10; 2.11; connector
2.12; 2.13; 2.14 connector
2.15; connector
3 wall
4 inner surface
5.1; 5.2; 5.3 head piece
6 usable surface
7.1, 7.2 abutting surface
8.1, 8.2 side surface
9 first groove
10 groove bottom
11 sub-surface
12.1; 12.2 foot
12.3; 12.4 foot
13 groove flank
14 locking arm
15 lip
16 edge
17 inner surface
18 bearing surface (of 2)
19 bevel
20 locking roller
21.1; 21.2 pressure surface (of 2)
22 sliding surface (of 2)
23 groove flank
24 side surface
25 sharp transition
26 base surface
27 base
28 outer surface
29 lower surface
30 foot
31, 32 end
33.1, 33.2 groove flank
34 floor
35 bottom
36 depression
37 recess
38 core layer
39 usable layer
40 bottom layer
41 decor layer
42 base part
43 wall part (leg)
44 outer surface (of 42)
45 transition region
46 surface (of 20)
47 transition region
48.1; 48.2; 48.3 projection
49.1, 49.2 insertion edge
50 second groove (of 14)
51 gradation (of 2.5)
52 groove (of 1.2)
53 sliding surface
54 inner surface
55 web (of 2.9)

56.1, 56.2, 56.3 tongue
56.4, 56.5 tongue
57 bending line
58.1, 58.2, 58.3 window
58.4, 58.5 window
59 inner surface
60 seat
61 groove
62 groove
63 surface section
64 supporting surface
65 bearing surface
66 V-shaped groove
67 side surface (of 48.2)
68, 69 leg section (of 2.7)
70 rounding (of 12.2)
71 free end (of 48.3)
72 gap
73 outer surface (of 55)
74 outer surface (of 56)
75 inner edge
76 section
a, b thickness dimension
c straight line
d distance
α angle
β angle
γ angle
$\delta_1, \delta_2, \delta_3$ angle
ξ angle
A pivot axis
L total length
Q1; Q2; Q3; Q4 cross-section
Q5; Q6; Q7; Q8 cross-section
Q9; Q10; Q11; Q12 cross-section
Q13; Q14; Q15 cross-section
S gap
T perpendicular
X, Y arrow
100 device

The invention claimed is:

1. A building panel comprising:
a device for connecting the building panel to at least one further similar building panel on a sub-surface, wherein the building panel is intended to be lowered against an already installed building panel, wherein
each building panel has mutually opposing profiled first and second side surfaces, at each of which an abutting surface is disposed, which is perpendicular to a usable surface or surface of the building panel;
the abutting surface of the first side surface transitions into a first groove, which extends along the first side surface of the building panel;
a locking arm protrudes further horizontally than the abutting surface of the first side surface of the building panel;
the locking arm ends in an approximately trapezoidal lip, which is directed towards the usable surface and has, in turn, an inner surface ending in a bottom of the locking arm;
the first groove has a bottom, which is set back with respect to the abutting surface of the first side surface;
an elongated, at least partly flexible, separate connector, which in the installed state of the building panels cooperates with the second side surface of an opposing building panel, is inserted at least partly in the first groove of the building panel;
the connector, in the undeformed state, has an approximately gutter-shaped cross-section and an at least partly arched wall, comprising a base part and a leg;
an at least sectionally partly cylindrical or partly elliptical inner surface of the wall transitions at one edge of this inner surface, as seen in the cross-section of the connector, into a head piece and, at a different edge, into a foot;
the foot has a side surface, which is directed outward and faces the inner surface of the lip in the installed state, and a base adjoining the side surface;
in the installed state of the connector, the head piece of the connector points in the direction of the usable surface;
in the installed state of the connector, the leg, which adjoins the base part and ends in the head piece, is disposed movably so that, when the building panels are joined, the leg is swiveled together with the head piece in the direction of the groove bottom;
the second side surface has a locking roller, which, while two building panels are being joined, engages with the inner space of the opposing building panel spanned by the inner surface of the connector,
the locking roller transitions into a recess of the building panel which is open in the direction of the base surface;
the bottom of the locking arm and the first groove, as well as the inclined inner surface of the lip, form a seat for accommodating the connector; and
wherein the head piece, in the state in which the connector is fitted into the first groove, presses at least in some sections against a first flank of said groove,
characterized in that:
the side surface and the base of the foot of the connector as well as the base part of the connector facing the bottom are in contact with the inner surface of the lip and the bottom of the locking arm before and after two building panels are joined,
wherein:
(1) the lip of the locking arm narrows away from the abutting surface as the lip extends in a direction toward the bottom of the locking arm; and
(2) the inner surface of the lip of the locking arm is inclined toward the abutting surface as the lip extends in a direction away from the bottom of the locking arm,
wherein the locking roller has at least one flat pressing surface, which, during the connection of two building panels, strikes against the head piece, whereby the head piece is swiveled in the direction of the groove bottom, and
wherein the connector, in the undeformed state, has a substantially curved, arched section that defines a locking roller receiving space, the connector including a plurality of rectangular tongues that protrude outwardly from the connector in a direction away from the locking roller receiving space in a curved manner, each tongue having a substantially arched shape.

2. The building panel of claim 1, characterized in that
the pressing surface is disposed at an incline with respect to the usable surface, the base surface of the building panel, and the bottom of the locking arm,
the locking roller has at least one rounded surface, and
the first groove has a second groove flank that extends at an incline, starting from the groove bottom to the bottom of the locking arm.

3. The building panel of claim 2, characterized in that the rounded surface of the locking roller transitions, via a flat surface, which is disposed at an incline or perpendicularly with respect to the usable surface, into the recess.

4. The building panel of claim 1, characterized in that the head piece has a flat bearing surface which, in the inserted state of the connector, faces the first groove flank and, in turn, is continued in a beveled or a rounded sliding surface 22.

5. The building panel of claim 4, characterized in that:
the head piece has a flat second bearing surface, which faces away from the bearing surface and extends between the sliding surface and the leg; and
the second bearing surface, in the inserted state of the connector and after the locking roller has been introduced, makes contact with a flat supporting surface of the locking roller and is disposed parallel or inclined with respect to the groove surface.

6. The building panel of claim 4, characterized in that the head piece, in a top view of the bearing surface thereof, is strip-shaped and tapers to the outside in the direction of at least one narrow side, forming a beveled insertion edge.

7. The building panel of claim 1, characterized in that the first groove flank of the first groove extends plane-parallel to the usable surface.

8. The building panel of claim 1, characterized in that at least one depression, which extends parallel to the longitudinal direction of the side surface, is introduced in the bottom of the locking arm.

9. The building panel of claim 1, characterized in that the side surface of the foot transitions, via an elongated edge facing away from the base, into the inner surface of the wall.

10. The building panel of claim 1, characterized in that:
the abutting surface of the building panel cooperating with the connector transitions into the locking roller via a bevel which is set back with respect to said abutting surface, and
the bevel, together with the locking roller, forms a pointed, concave transition, at which the head piece is supported after the locking roller has been introduced into the connector.

11. The building panel of claim 1, characterized in that:
the abutting surface of the building panel cooperating with the connector transitions into the locking roller via a trapezoidal groove, and
the head piece engages with the groove after the locking roller has been introduced into the connector.

12. The building panel of claim 1, characterized in that the foot is web-shaped.

13. The building panel of claim 12, characterized in that the partly cylindrical or partly elliptical inner surface of the connector leads via a planar, strip-shaped inner surface into the elongated edge of the web-shaped foot.

14. The building panel of claim 13, characterized in that the planar, strip-shaped inner surface adjoining the edge forms an acute angle ($\gamma$) with an outwardly directed side surface of the foot.

15. The building panel of claim 13, characterized in that the planar, strip-shaped inner surface adjoining the edge extends parallel to the outwardly directed side surface of the foot.

16. A building panel of claim 1, characterized in that
the bottom of the locking arm, the inner surface of the lip, and a groove flank, which is located opposite the lip and bounds the bottom, form a second groove, and
the base part of the connector is fixable in the second groove.

17. The building panel of claim 16, characterized in that the second groove tapers in the direction of the usable surface in such a manner that the inner surface of the lip forms an acute angle ($\beta$) with the groove flank of said groove.

18. The building panel of claim 16, characterized in that the connector, in a transition region of the base part thereof to the movable leg, has at least one outwardly protruding projection, which extends in the longitudinal direction of the connector and, in the inserted state of the connector, makes contact with the groove flank of the second groove.

19. The building panel of claim 16, characterized in that the connector has at least one web, which protrudes outwardly, extends in the longitudinal direction of the connector, is elastically deformable and which, starting from a transition region of the base part to the movable leg and as seen in the cross-section of the connector, is disposed at an incline with respect to the undeformed leg and, in the inserted state of the connector, makes contact with the beveled groove flank of the first groove.

20. The building panel of claim 1, characterized in that each tongue is produced in one piece with the wall of the connector, with a window extending through the wall of the connector.

* * * * *